US011455695B2

(12) United States Patent
Rahman et al.

(10) Patent No.: US 11,455,695 B2
(45) Date of Patent: Sep. 27, 2022

(54) SYSTEM AND METHOD FOR MODELLING AND FORECASTING ELECTRICITY DEMAND

(71) Applicant: Saudi Arabian Oil Company, Dhahran (SA)

(72) Inventors: Sabbir A. Rahman, Dhahran (SA); Yasmin A. Aljedawi, Khobar (SA)

(73) Assignee: Saudi Arabian Oil Company, Dhahran (SA)

( * ) Notice: Subject to any disclaimer, the term of this patent is extended or adjusted under 35 U.S.C. 154(b) by 317 days.

(21) Appl. No.: 16/716,015

(22) Filed: Dec. 16, 2019

(65) Prior Publication Data

US 2021/0182980 A1    Jun. 17, 2021

(51) Int. Cl.
| | |
|---|---|
| G06Q 50/06 | (2012.01) |
| G06Q 30/02 | (2012.01) |
| G06Q 10/06 | (2012.01) |
| H02J 3/00 | (2006.01) |

(52) U.S. Cl.
CPC ........... *G06Q 50/06* (2013.01); *G06Q 10/067* (2013.01); *G06Q 30/0202* (2013.01); *G06Q 30/0204* (2013.01); *H02J 3/003* (2020.01)

(58) Field of Classification Search
None
See application file for complete search history.

(56) References Cited

U.S. PATENT DOCUMENTS

| | | | |
|---|---|---|---|
| 7,076,368 B2 | 7/2006 | Wada | |
| 7,711,655 B2* | 5/2010 | Abe | G06Q 30/0283 |
| | | | 705/400 |
| 8,695,365 B2* | 4/2014 | Yazaki | F25D 21/006 |
| | | | 62/230 |
| 8,768,527 B2* | 7/2014 | Tomita | H02J 3/14 |
| | | | 705/412 |
| 9,230,289 B2* | 1/2016 | Omitaomu | H02J 13/0006 |
| 9,461,470 B2* | 10/2016 | Cox | H02J 3/004 |

(Continued)

FOREIGN PATENT DOCUMENTS

EP    2975722 A1    1/2016

OTHER PUBLICATIONS

Fazeli, Reza, Matthias Ruth, and Brynhildur Davidsdottir. "Temperature response functions for residential energy demand—A review of models." Urban Climate 15 (2016): 45-59.

(Continued)

*Primary Examiner* — Umut Onat
(74) *Attorney, Agent, or Firm* — Leason Ellis LLP

(57) ABSTRACT

A technological solution for controlling generation or distribution of electric power in a power generation and distribution network. The solution includes modeling and forecasting electricity demand in the power generation and distribution network, which includes a plurality of nodes each having cooling appliances, heating appliances, or both cooling and heating appliances. The solution includes, among other things, building a per-capita parametric model of an electric demand curve for a geographic region, modeling residual intraday variations in electric demand, determining an average residual variation in demand, iteratively optimizing the residual intraday variations in demand and the average residual variation in demand, and determining electricity demand per-capita for the geographic region.

24 Claims, 26 Drawing Sheets

(56) References Cited

U.S. PATENT DOCUMENTS

| | | | |
|---|---|---|---|
| 10,068,298 B2 | 9/2018 | Srivastava | |
| 10,094,586 B2 | 10/2018 | Pavloski et al. | |
| 10,205,369 B2 | 2/2019 | Williams | |
| 10,635,056 B2* | 4/2020 | Irisarri | G05B 15/02 |
| 10,673,241 B2* | 6/2020 | Nakayama | H02J 7/0047 |
| 10,833,508 B2* | 11/2020 | Wang | H02J 3/004 |
| 11,055,732 B2* | 7/2021 | Sun | H02J 3/466 |
| 11,101,658 B2* | 8/2021 | McDonnell | H02J 3/383 |
| 11,195,105 B2* | 12/2021 | Hanen | G06Q 10/063 |
| 2004/0254899 A1* | 12/2004 | Abe | G06Q 10/06 |
| | | | 705/412 |
| 2012/0083930 A1 | 4/2012 | Ilic et al. | |
| 2014/0058572 A1 | 2/2014 | Stein et al. | |
| 2014/0324532 A1 | 10/2014 | Ghosh et al. | |
| 2014/0336960 A1* | 11/2014 | Haghighat-Kashani | |
| | | | H02J 13/0006 |
| | | | 702/60 |
| 2020/0210894 A1* | 7/2020 | Mimura | G06F 21/552 |

OTHER PUBLICATIONS

Hyndman, Rob J., and Shu Fan. "Density forecasting for long-term peak electricity demand." IEEE Transactions on Power Systems 25.2 (2009): 1142-1153.

Aufliammer, Maximilian, and Erin T. Mansur. "Measuring climatic impacts on energy consumption: A review of the empirical literature." Energy Economics 46 (2014): 522-530.

Bessec, Marie, and Julien Fouquau. "The non-linear link between electricity consumption and temperature in Europe: a threshold panel approach." Energy Economics 30.5 (2008): 2705-2721.

Bodyanskiy, Yevgeniy, Sergiy Popov, and Taras Rybalchenko. "Feedforward neural network with a specialized architecture for estimation of the temperature influence on the electric load." 2008 4th International IEEE Conference Intelligent Systems. vol. 1. IEEE, 2008.

Price, Philip. "Methods for analyzing electric load shape and its variability." No. LBNL-3713E. Lawrence Berkeley National Lab. (LBNL), Berkeley, CA (United States), 2010.

Suganthi, L., and Anand A. Samuel. "Energy models for demand forecasting—A review." Renewable and sustainable energy reviews 16.2 (2012): 1223-1240.

Henley, Andrew, and John Peirson. "Non-linearities in electricity demand and temperature: parametric versus non-parametric methods." Oxford bulletin of economics and statistics 59.1 (1997): 149-162.

Gajowniczek, Krzysztof, and Tomasz Zbkowski. "Two-stage electricity demand modeling using machine learning algorithms." Energies 10.10 (2017): 1547.

Sigauke, Caston. Modelling electricity demand in South Africa. Diss. University of the Free State, 2014.

Alabbas, Nabeel, and Joseph Nyangon. "Weather-Based Long-Term Electricity Demand Forecasting Model for Saudi Arabia: A Hybrid Approach Using End-Use and Econometric Methods for Comprehensive Demand Analysis." Implications of North American Energy Self-Sufficiency, 34th USAEE/IAEE North American Conference, Oct. 23-26, 2016. International Association for Energy Economics, 2016.

Cancelo J et al., "Forecasting the electricity load from one day to one week ahead for the Spanish system operator." International Journal of forecasting 24.4 (2008): 588-602.

Hutton et al., "A probabilistic methodology for quantifying, diagnosing and reducing model structural and predictive errors in short term water demand forecasting." Environmental Modelling & Software 66 (2015): 87-97.

International Search Report and Written Opinion in Corresponding PCT Application No. PCT/US2020/064991 dated Mar. 18, 2021. 12 pages.

* cited by examiner

| Day | Jan 1 | Feb 2 | Mar 3 | Apr 4 | May 5 | Jun 6 | Jul 7 | Aug 8 | Sep 9 | Oct 10 | Nov 11 | Dec 12 |
|---|---|---|---|---|---|---|---|---|---|---|---|---|
| 1 | -5.8 | 14.7 | -6.0 | 5.5 | -9.7 | 28.8 | -9.4 | 10.0 | 22.4 | 0.7 | 8.1 | -2.3 |
| 2 | -7.8 | 11.1 | 1.7 | -4.9 | -11.8 | 10.6 | -4.9 | 12.5 | 19.5 | 12.5 | 9.1 | 3.8 |
| 3 | -4.8 | -7.8 | 0.0 | 14.7 | -7.7 | 13.3 | -4.6 | 11.7 | 12.1 | 10.9 | 6.4 | 3.9 |
| 4 | -4.1 | -0.5 | -7.6 | 33.3 | 17.9 | 30.9 | -8.2 | 13.3 | 8.9 | -2.5 | 7.3 | 4.4 |
| 5 | -7.2 | 5.0 | -10.1 | 18.7 | 15.0 | 17.9 | -9.9 | 10.9 | 4.4 | -2.3 | 8.3 | 6.5 |
| 6 | -10.0 | 8.1 | 6.3 | 9.2 | -6.7 | 11.1 | -6.5 | 18.4 | 2.1 | -1.9 | 3.0 | 0.5 |
| 7 | -7.8 | 12.9 | 16.3 | 1.6 | 15.3 | 17.1 | -9.4 | -9.2 | 6.5 | -1.5 | 8.0 | 5.4 |
| 8 | -7.6 | 4.4 | 7.1 | -5.8 | 10.1 | 19.9 | -10.0 | -11.0 | 7.8 | 10.2 | 25.3 | 3.8 |
| 9 | 13.5 | 0.1 | -3.5 | 18.3 | 15.9 | 19.0 | -8.4 | -4.8 | 18.9 | 2.9 | 22.5 | 8.6 |
| 10 | -2.7 | -2.6 | 18.9 | -21.3 | -20.8 | 7.8 | 3.3 | 13.3 | 3.8 | 1.8 | 6.0 | 3.6 |
| 11 | -6.5 | -5.7 | 4.0 | 36.8 | 44.4 | 11.5 | 0.4 | -14.1 | -5.8 | 15.2 | 15.9 | -2.0 |
| 12 | -0.8 | 1.9 | -3.0 | 22.3 | 40.5 | 6.1 | -0.7 | 12.1 | 10.3 | 7.6 | 11.1 | 4.5 |
| 13 | 8.1 | 10.3 | 0.6 | -5.8 | -20.4 | 17.2 | 0.3 | -6.7 | -6.4 | -0.6 | 1.4 | -2.1 |
| 14 | 12.6 | 7.2 | -4.3 | -0.1 | -5.7 | 18.7 | -6.9 | 1.3 | -10.4 | 3.3 | 5.3 | -10.3 |
| 15 | 9.3 | 7.7 | 0.9 | 9.5 | 4.5 | 14.8 | -6.1 | -8.7 | -13.2 | -7.7 | 6.4 | -12.5 |
| 16 | 3.4 | -11.1 | 12.2 | -10.4 | -1.3 | 5.9 | -1.8 | -1.9 | -6.9 | -5.6 | 3.2 | -5.3 |

FIG. 26A

| Day | Jan 1 | Feb 2 | Mar 3 | Apr 4 | May 5 | Jun 6 | Jul 7 | Aug 8 | Sep 9 | Oct 10 | Nov 11 | Dec 12 |
|---|---|---|---|---|---|---|---|---|---|---|---|---|
| 16 | 3.4 | -11.1 | 12.2 | 10.4 | -1.3 | 5.9 | -1.8 | -1.9 | -6.9 | -5.6 | 3.2 | -5.3 |
| 17 | 0.7 | -11.7 | 8.2 | 17.3 | 0.2 | 1.3 | 6.0 | 6.5 | -4.2 | 5.3 | 3.6 | -0.6 |
| 18 | 4.9 | -4.2 | 4.9 | -6.7 | 5.8 | 0.5 | 2.5 | -10.9 | 1.7 | 7.1 | -4.4 | 5.5 |
| 19 | -1.1 | -4.0 | 15.2 | 4.4 | 14.4 | 3.4 | -4.0 | -6.0 | -3.2 | 3.7 | -4.7 | 3.0 |
| 20 | -2.9 | 2.1 | 16.6 | 3.9 | -0.6 | -0.9 | -5.2 | -4.1 | -0.9 | -8.0 | -4.9 | 8.1 |
| 21 | 0.0 | 5.2 | 0.3 | 11.5 | 8.0 | 8.3 | -8.1 | -0.2 | 5.5 | 5.7 | -3.9 | 10.3 |
| 22 | 2.5 | 5.0 | 1.2 | -17.1 | 12.0 | 9.7 | -9.5 | 12.4 | -1.3 | 7.4 | -5.4 | 8.4 |
| 23 | -2.5 | 2.6 | 6.0 | -20.6 | 11.7 | 5.1 | -15.3 | 13.7 | -4.0 | 13.1 | -6.3 | 11.0 |
| 24 | -0.8 | 3.0 | 10.1 | -2.1 | 9.5 | 0.2 | -15.5 | 12.9 | 8.3 | 10.4 | -6.8 | 5.4 |
| 25 | 1.2 | -3.6 | 0.6 | 10.4 | 29.0 | -0.7 | -11.1 | 18.7 | 14.4 | 19.5 | -9.5 | -2.9 |
| 26 | -1.0 | -17.2 | -2.5 | 0.3 | 19.5 | 1.8 | -14.4 | 15.6 | -2.0 | 14.0 | -16.7 | -0.4 |
| 27 | -1.4 | 6.5 | -7.9 | -3.4 | -2.7 | -0.2 | -6.2 | 9.2 | 11.8 | -6.0 | -10.1 | 4.0 |
| 28 | -1.5 | -1.8 | -5.8 | 13.7 | 2.4 | -2.1 | -12.1 | 4.6 | 13.3 | -3.0 | -8.0 | 13.2 |
| 29 | -0.8 | -23.3 | -12.6 | 17.4 | 2.7 | -5.7 | -15.6 | 3.8 | 2.3 | 9.4 | -4.1 | 10.2 |
| 30 | 1.3 |  | 15.3 | 1.8 | 11.4 | -6.2 | -12.6 | 18.8 | 4.9 | 1.0 | 3.2 | 2.7 |
| 31 | -2.8 |  | 10.9 |  | 19.1 |  | -11.7 | 18.0 |  | 1.9 |  | -4.4 |

FIG. 26B

SYSTEM AND METHOD FOR MODELLING AND FORECASTING ELECTRICITY DEMAND

TECHNOLOGICAL FIELD OF THE DISCLOSURE

The present disclosure relates to a system, a method, and a computer program for modeling and forecasting electricity demand, including modelling and forecasting one or more drivers of regional electricity demand.

BACKGROUND OF THE DISCLOSURE

Forecasting electricity demand can be extremely important to the electric power industry. Accurate load forecasting can be elusive, and visibility into accurate load forecasting can be nearly impossible with existing modeling approaches. There exists an unfulfilled need for accurate electricity demand modeling that can accurately forecast electric load demands, while simultaneously providing visibility into the significance and impact of driver of electricity demand.

SUMMARY OF THE DISCLOSURE

According to a nonlimiting embodiment of the disclosure, a method is provided for modeling and forecasting electricity demand in a power generation and distribution network which includes a plurality of nodes each having cooling appliances, heating appliances, or both cooling and heating appliances. The method comprises: building a per-capita parametric model of an electric demand curve as a function of temperature and time for a geographic region in the power generation and distribution network; modeling residual intraday variations in electric demand with respect to intraday variations in temperature from a daily temperature mean; determining an average residual variation in demand with respect to an intraday time period; iteratively optimizing the residual intraday variations in demand and the average residual variation in demand by updating parameters in the parametric model until a residual error is below a predetermined threshold; and determining electricity demand per-capita for the geographic region.

The method can comprise determining the residual error based on at least one of: a cooling demand function COOL(T,$T_{avg}$); a heating demand function HEAT(T,$T_{avg}$); an intraday temperature variation function ITV(T,$T_{avg}$); a humidity function HUM(H,$H_{avg}$,$T_{avg}$); a vacation demand function VAC(T,H,$H_{avg}$); and a calendar effect function $CAL_t$, where T is population-weighted temperature, $T_{avg}$ is daily average temperature, H is population-weighted humidity, and $H_{avg}$ is daily average humidity.

The method can comprise modeling effects of humidity on the electric demand curve.

The method can comprise modeling effects of temperature on the electric demand curve.

The method can comprise determining the average residual variation in demand throughout a lunar calendar year or solar calendar year.

The method can comprise: determining a distinguishable effect in the residual intraday variations in demand; generating a plurality of demand models; and prioritizing the plurality of demand models based on a magnitude of contribution to residual demand.

In the method, generating the plurality of demand models can comprise parametrically modelling the distinguishable effect in the residual intraday variations in demand to build at least one of the plurality of demand models.

The method can comprise applying a seasonal variation function to the residual intraday variations in demand.

The method can comprise transmitting the electricity demand per-capita for the geographic region to a communicating device.

The method can comprise estimating an evolution of one or more parameters in the parametric model over time.

In the method, the estimating the evolution of one or more parameters in the parametric model can comprise sliding a window of a fixed period length to optimize a value of a parameter of interest while keeping remaining parameters fixed.

The method can comprise applying the determined electricity demand per-capita for the geographic region to modify one or more electricity transmission parameters in a power generation station to adjust electric power distributed in a power generation and distribution network.

The method can comprise supplying the adjusted electric power to a node in the geographic region.

According to another embodiment of the disclosure, a system is provided for modeling and forecasting electricity demand in a power generation and distribution network that includes a plurality of nodes having cooling appliances or heating appliances. The system comprises an electricity demand modeler configured to build a per-capita parametric model of an electric demand curve as a function of temperature and time for a geographic region in the power generation and distribution network, model residual intraday variations in demand with respect to intraday variations in temperature from a daily temperature mean, determine an average residual variation in demand with respect to an intraday time period, and iteratively optimize the residual intraday variations in demand and the average residual variation in demand by updating parameters in the parametric model until a residual error is below a predetermined threshold. The system further comprises an electricity demand forecaster that transmits an electricity demand per-capita model for the geographic region to a communicating device.

In the system, the electricity demand modeler can be configured to determine the residual error based on at least one of: a cooling demand function COOL(T,$T_{avg}$); a heating demand function HEAT(T,$T_{avg}$); an intraday temperature variation function ITV(T,$T_{avg}$); a humidity function HUM(H,$H_{avg}$,$T_{avg}$); a vacation demand function VAC(T,H,$H_{avg}$); and a calendar effect function $CAL_t$, where T is population-weighted temperature, $T_{avg}$ is daily average temperature, H is population-weighted humidity, and $H_{avg}$ is daily average humidity.

In the system, the electricity demand modeler can be configured to model effects of humidity on the electric demand curve.

In the system, the electricity demand modeler can be configured to model effects of temperature on the electric demand curve.

In the system, the electricity demand modeler can be configured to determine the average residual variation in demand throughout a lunar calendar year or solar calendar year.

In the system, the electricity demand modeler can be configured to: determine a distinguishable effect in the residual intraday variations in demand; generate a plurality of demand models; and prioritize the plurality of demand models based on a magnitude of contribution to residual demand.

In the system, the electricity demand modeler can be configured to generate the plurality of demand models by parametrically modelling the distinguishable effect in the residual intraday variations in demand to build at least one of the plurality of demand models.

In the system, the electricity demand modeler can be configured to apply a seasonal variation function to the residual intraday variations in demand.

According to another embodiment of the disclosure, a non-transitory computer readable storage medium is provided, storing electric demand modeling and forecasting instructions for causing per capita electric demand for a region in a power generation and distribution network that includes a plurality of nodes having cooling appliances or heating appliances to be modeled and forecasted. The program instructions comprise the steps of: building a per-capita parametric model of an electric demand curve as a function of temperature and time for a geographic region in the power generation and distribution network; modeling residual intraday variations in demand with respect to intraday variations in temperature from a daily temperature mean; determining an average residual variation in demand with respect to an intraday time period; iteratively optimizing the residual intraday variations in demand and the average residual variation in demand by updating parameters in the parametric model until a residual error is below a predetermined threshold; and determining electricity demand per-capita for the geographic region.

In the non-transitory computer readable storage medium, the program instructions can comprise the further step of determining the residual error based on at least one of: a cooling demand function $COOL(T,T_{avg})$; a heating demand function $HEAT(T,T_{avg})$; an intraday temperature variation function $ITV(T,T_{avg})$; a humidity function $HUM(H,H_{avg}, T_{avg})$; a vacation demand function $VAC(T,H,H_{avg})$; and a calendar effect function $CAL_f$, where T is population-weighted temperature, $T_{avg}$ is daily average temperature, H is population-weighted humidity, and $H_{avg}$ is daily average humidity.

In the non-transitory computer readable storage, the program instructions can comprise the step of modeling effects of temperature or humidity on the electric demand curve.

In the non-transitory computer readable storage, the program instructions can comprise the step of applying the determined electricity demand per-capita for the geographic region to modify one or more electricity transmission parameters in a power generation station to adjust electric power distributed in a power generation and distribution network.

In the non-transitory computer readable storage medium, the program instructions can comprise the step of supplying the adjusted electric power to a node in the geographic region.

According to nonlimiting technological solution provided in the disclosure, a system, method and/or computer program are provided for controlling generation or distribution of electric power in a power generation and distribution network. The technological solution comprises modeling and forecasting electricity demand in the power generation and distribution network, which includes a plurality of nodes, and adjusting generation or distribution of the electric power in one or more regions in the power generation and distribution network. The technological solution includes: building a per-capita parametric model of an electric demand curve as a function of temperature and time for a geographic region in the power generation and distribution network; modeling residual intraday variations in electric demand with respect to intraday variations in temperature from a daily temperature mean; determining an average residual variation in demand with respect to an intraday time period; iteratively optimizing the residual intraday variations in demand and the average residual variation in demand by updating parameters in the parametric model until a residual error is below a predetermined threshold; and determining electricity demand per-capita for the geographic region. The technological solution can include applying the determined electricity demand per-capita for the geographic region to modify one or more electricity transmission parameters in a power generation station to adjust electric power distributed in a power generation and distribution network. The technological solution can include supplying the adjusted electric power to a node in the geographic region.

Additional features, advantages, and embodiments of the disclosure may be set forth or apparent from consideration of the detailed description and drawings. Moreover, it is to be understood that the foregoing summary of the disclosure and the following detailed description and drawings provide non-limiting examples that are intended to provide further explanation without limiting the scope of the disclosure as claimed.

BRIEF DESCRIPTION OF THE DRAWINGS

The accompanying drawings, which are included to provide a further understanding of the disclosure, are incorporated in and constitute a part of this specification, illustrate embodiments of the disclosure and together with the detailed description serve to explain the principles of the disclosure. No attempt is made to show structural details of the disclosure in more detail than may be necessary for a fundamental understanding of the disclosure and the various ways in which it may be practiced.

FIGS. 25A and 25B show an example of a table that can be determined based on a lunar calendar correction function, according to the principles of the disclosure.

FIGS. 26A and 26B show an example of a table that can be determined based on a solar calendar correction function, according to the principles of the disclosure.

Figure 1:
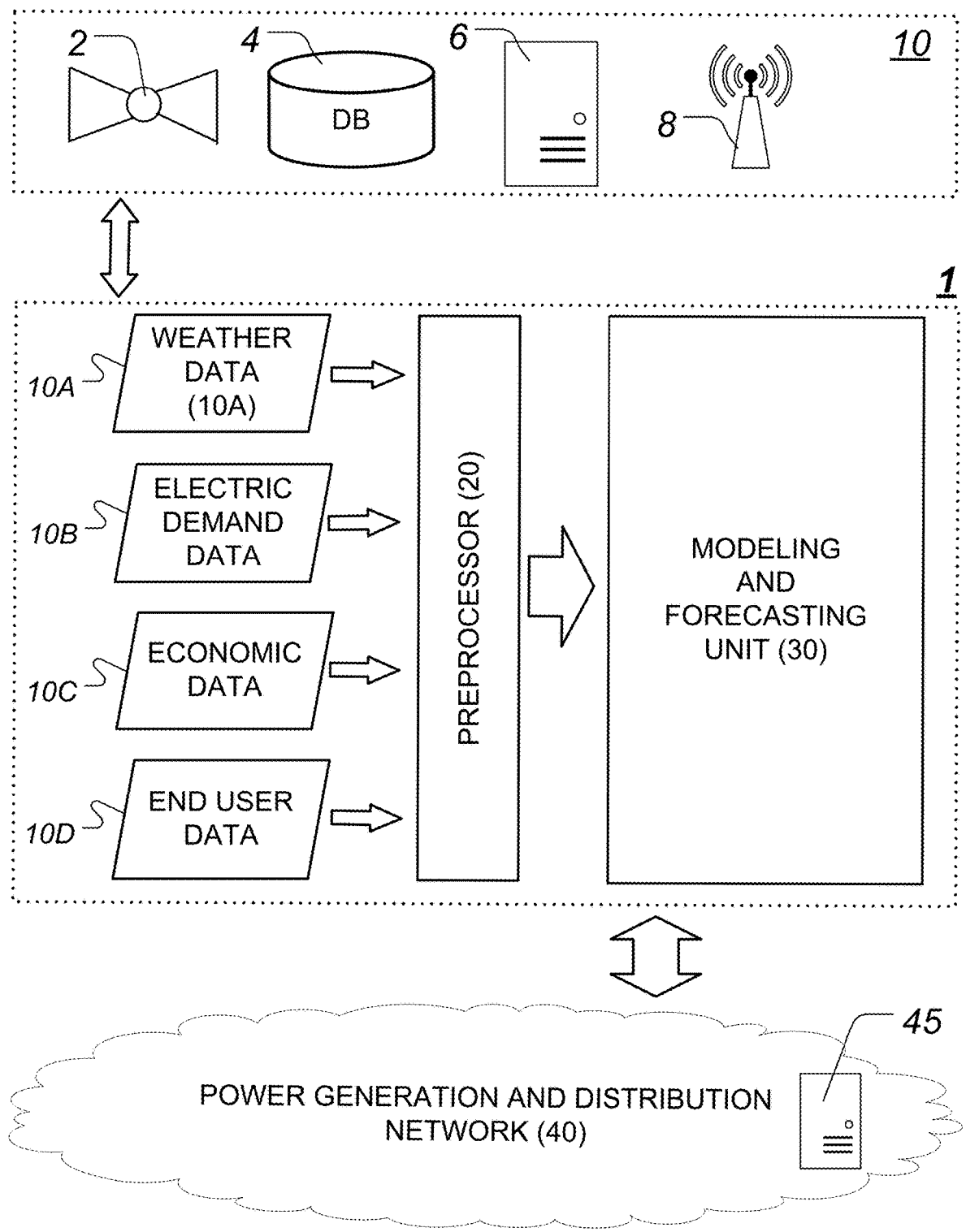
FIG. 1 shows a block diagram of an embodiment of an electricity demand modelling and forecasting (EDMF) system that is constructed according to the principles of the disclosure.

The present disclosure is further described in the detailed description that follows.

DETAILED DESCRIPTION OF THE DISCLOSURE

The disclosure and its various features and advantageous details are explained more fully with reference to the non-limiting embodiments and examples that are described or illustrated in the accompanying drawings and detailed in the following description. It should be noted that features illustrated in the drawings are not necessarily drawn to scale, and features of one embodiment may be employed with other embodiments as those skilled in the art would recognize, even if not explicitly stated. Descriptions of well-known components and processing techniques may be omitted so as to not unnecessarily obscure the embodiments of the disclosure. The examples are intended merely to facilitate an understanding of ways in which the disclosure may be practiced and to further enable those skilled in the art to practice the embodiments of the disclosure. Accordingly, the examples and embodiments should not be construed as limiting the scope of the disclosure. Moreover, it is noted that like reference numerals represent similar parts throughout the several views of the drawings.

Accurate electricity load forecasting can be elusive, and visibility into accurate load forecasting can be nearly impossible with state-of-the-art modeling approaches. Existing electricity demand forecasting models tend to use neural networks that are fed input data for all expected drivers. While such modeling approaches can accurately forecast electricity demand, they, however, have limited explanatory power. Neural networks by their nature do not provide any visibility into the parametric modeling that is carried out for each of the drivers of electricity demand for a given region.

There exists an urgent unfulfilled need for an electricity demand modelling and forecasting solution that can provide accurate electricity demand modeling, and that can accurately forecast electric load as a function of one or more drivers, while simultaneously providing visibility into the significance and impact of each driver on the overall electricity demand model for a given region. The instant disclosure provides such an electricity demand modeling and forecasting solution, which includes a modelling and forecasting system, method, and computer program.

According to a non-limiting embodiment of the disclosure, given intraday temperature, humidity and electricity demand data for any given geographic region, the disclosed electricity demand modelling and forecasting solution can be applied to understand and accurately model the impact of weather and non-weather drivers on that region's electricity demand. The modeling and forecasting solution can include modelling high-level features of electricity demand, which can be due to an underlying base load plus any requirements for heating or cooling, and then modeling any residual demand. The solution can further include determining a leading driver of the residual and building a parametric or non-parametric model of the driver's effect on electricity demand. This process of modeling a residual demand can be repeated in an iterative fashion until all key drivers have been accounted for and any remaining residual demand is small or negligible, or until there are no patterns or features in any residual demand for further drivers to be determined, in which any remaining residual can be assumed to be due to noise or natural statistical variations.

Besides heating and cooling effects, the solution can take into consideration other weather-specific drivers, including, for example, intraday temperature variations, intraday humidity variations, intraday wind speed-direction variations, intraday cloud-cover variations, inter-day temperature variations, inter-day humidity variations, inter-day wind speed-direction variations, inter-day cloud-cover variations, or any other weather-related conditions that could affect electricity demand.

The solution can also take into consideration non-weather drivers such as, for example, population size, energy cost, economic activity, and human behavioral patterns, which can depend, for example, on the time of day, day of week or month, month of year, holidays, religious festivals, or any other special occasion.

A non-limiting embodiment of the modelling and forecasting solution can include building a forecasting model that includes calibration on an hourly frequency and a per capita basis, covering historical data over long periods of time, such as, for example 1, 2, 5, 10, or more years. The solution can provide accurate quantification of the impact of drivers such as, for example, weather, energy costs, economic activity, human behavior, and population on aggregate interconnected electricity demand during a specific period. The solution can provide visibility into drivers that can affect growth (or contraction) in regional electricity demand. The solution can also model expected effects on electricity demand due to factors such as, for example, policy decisions, environmental conditions or other changes that can affect drivers of electricity demand in a geographic region. By tracking variations in observed electricity demand, the solution can measure how parameters in a model may vary, as well as the drivers that vary with time.

FIG. 1 shows a block diagram of an embodiment of an electricity demand modelling and forecasting (EDMF) system 1, according to the principles of the disclosure. The EDMF system 1 can include a plurality of data sources 10, a preprocessor 20, and a modeling and forecasting unit 30. The data sources 10 can include, for example, a satellite 2, a database 4, a server 6, or a sensor 8. The preprocessor 20 can convert the received data 10A to 10D, as well as other data (such as, for example, population, calendar-specific, weather, electricity demand, or other relevant data) from its native form, format or protocol to a form, format, or protocol used in the modeling and forecasting unit 30. The EDMF system 1 can be connected to a power generation and distribution (PGD) network 40. The data sources 10 can be located in the PGD network 40, or they can be located external to the PGD network 40, as seen in FIG. 1. The EDMF system 1 can receive weather data 10A, electricity demand data 10B, economic data 10C, or end user data 10D from the data sources 10 and generate an electricity demand model of a portion or the entirety of the PGD network 40. The generated demand model can accurately describe and forecast electricity demand in the PGD network 40 over an extended period of time, ranging anywhere from seconds to ten (10) or more years into the future.

The satellite 2 can include, for example, a weather satellite, a weather balloon, an aircraft, or any other communicating device that can provide real-time data relating to weather conditions for a geographic region.

The database 4 can include historical data for one or more geographic regions. The database 4 can be located in the EDMF system 1. The database 4 can include a plurality of relational databases. The database 4 can include a plurality of searchable data fields, including, for example, geographic location (e.g., global positioning system (GPS) coordinates), date, time, weather conditions (e.g., temperature, pressure, humidity, wind speed, wind direction, visibility, solar intensity), economic conditions (e.g., employment statistics, market conditions, gross-domestic product value, currency exchange rates), energy costs (e.g., cost per kilowatt-hour (kWh), cost per liter), population demographics (e.g., population statistics broken down by age, gender, nationality, education level, profession, marital status), human behavior influencing events (e.g., holidays, holiday events, academic events, government events, calendar events, or any other events that can influence or affect human behavior).

The server 6 can include, for example, an educational institution server, a government server, a power or utility company server, a commercial server, an industry organization server, a trade organization server, a regional government agency server, or any other computing device that can provide weather data, electricity usage data, electricity demand data, economic data, population data, calendar-related data, and data relating to any other drivers of electricity demand for a geographic region. The server 6 can host a website that can be accessible by the EDMF system 1, or the server 6 can stream a data feed to the EDMF system 1, so as to continuously (or periodically) provide the most-recent data to the EDMF system 1.

The sensor 8 can include any of a variety of sensor devices that are located within the geographic region in the PGD network 40. The sensor 8 can include a communicating device. The sensor 8 can include a sensor device (not shown) that can measure weather conditions such as, for example, temperature, pressure, humidity, precipitation, moonlight intensity, solar intensity, wind speed, and wind direction. The sensor 8 can include a sensor device that can measure voltage, current, resistance, power factor, and electricity usage at each node in the PGD network 40 that is provided with a sensor 8. The sensor 8 can include, for example, a smart meter.

Although shown as being separate from the PGD network 40, the EDMF system 1 can be located in the PGD network 40. The EDMF system 1 can be integrated into the PGD network 40.

The EDMF system 1 can receive the weather data 10A from any data source 10, including, for example, the satellite 2, database 4, server 6, or sensor 8. The received weather data 10A can include real-time weather data for one or more geographic regions. The received weather data 10A can include historical data. The received weather data 10A can include computer weather forecast model data, including model data received from numerical weather prediction (NWP) models, the Canadian model, the European Centre for medium-range weather forecasts (ECMWF) model, the NCEP model, the RAP model, the SREF model, or any other model data received from data sources, such as, for example, National Weather Service, National Oceanic and Atmospheric Administration (NOAA), or AccuWeather.com.

The PGD network 40 can include a network of power generation plants (not shown) and power transmission and distribution grids (not shown). The PDG network 40 can include a communication network (not shown), or it can be connected to a communication network (not shown). In the PGD network 40, the power generation plants can generate electricity that the power transmission and distribution grids can deliver to a plurality of end user nodes in a geographic region. The geographic region can be as small as a building (such as, for example, a residential building, a commercial building, an industrial building or plant, a government building, a school building, a hospital building, a server farm, a data center, or any structure that can receive electricity), or as large as a country or continent.

According to a non-limiting example, the power transmission and distribution grids (not shown) in the PGD network 40 can include substations, step-up transformers, long distance transmission lines, step-down transformers, power distribution lines and any other components that can facilitate transmitting electricity from the power producers to the end users in the geographic region. The PGD network 40 can include one or more networks of local power transmission or distribution grids that can be connected for reliability and commercial purposes, and which can be formed into larger, more dependable networks to enhance coordination and planning of electricity supply to meet real-time and forecasted electricity demand for the geographic region.

The EDMF system 1 can receive electricity demand data 10B from the PGD network 40. The electricity demand data 10B can include real-time electricity usage data from one or more power plants (not shown) or power transmission or distribution grids (not shown) in the PDG network 40. The real-time electricity usage data can be received from a plurality of sensors 8, which can include smart meters distributed at end user nodes throughout the PGD network 40. For instance, each end user node (for example, residential, commercial, educational, healthcare, government, transportation, agriculture or manufacturing) can include a sensor 8 (e.g., smart meter) that measures and monitors all electricity inflow to the associated node, as well as all outflow of electricity from the node in the case where the end user node has an electricity generator such as, for example, a solar energy transducer, wind turbine or hydroturbine.

The communication network (not shown) can include a local area network (LAN), a wide area network (WAN), a metropolitan area network (MAN), a personal area network (PAN), a campus area network, a corporate area network, a global area network (GAN), a broadband area network (BAN), a cellular network, or the Internet, any of which can be configured to communicate data via a wireless or a wired communication medium. The communication network (not shown) can run any of a variety of protocols, including, for example, TCP/IP, IRC or HTTP. The communication network (not shown) can facilitate communication within the PGD network 40, as well as communication between nodes in the PGD network 40 and nodes located outside of the PGD network 40. The EDMF system 1 can communicate with the data sources 10 via a communication network (not shown).

The EDMF system 1 can receive economic data 10C from the database 4 or server 6, which can be maintained by an entity such as, for example, a regional government agency, an educational institution, an industry organization, a trade organization, an information vendor, or any other entity that can provide economic data relevant to a geographic region for which modeling and forecasting by the EDMF system 1 might be desired.

Similarly, the EDMF system 1 can receive end user data 10D for the geographic region from any of a number of data sources, such as, for example, a government agency, an industry organization, an educational institution, or the end users themselves. The end user data 10D can include population demographic data (e.g., population statistics broken down by age, gender, nationality, education level, profession, marital status) and human behavior influencing events data (e.g., holidays, holiday events, academic events, government events, calendar events, or any other events that can influence or affect human behavior).

The EDMF system 1 can generate an electricity demand model for the PGD network 40 that can accurately and comprehensively forecast electricity demand in a geographic region included in the PGD network 40. The EDMF system 1 can include historical analysis, strategic planning and decision making. The EDMF system 1 can quantify the impact of drivers such as weather, energy costs, population, economic conditions, government policies, tax policies, user behavior, and any other factors that can affect electricity demand in the geographic region, as well as provide visibility into the drivers and their quantitative effect on electricity demand in the geographic region. The EDMF system 1 can generate electricity demand forecasts on a granular level, such as, for example, hourly electricity consumption broken down by weather, energy costs, economic events, and human behavior components of electricity demand.

The electricity demand model generated by the EDMF system 1 can be used to forecast future electricity demand in the PGD network 40. The generated demand model can be transmitted to a communicating device 45 in the PGD network 40 or accessed by the communicating device 45, so that remedial action can be taken to address forecasted electricity demands in the region. The communicating device 45 can be located at, for example, a power generation plant or a substation in the PGD network 40. The communicating device 45 can be configured to monitor electricity usage in a portion or the entire PGD network 40 and control electricity supply to nodes in the PGD network 40. The communicating device 45 can be configured to monitor and control electricity transmission parameters of electrical power distributed in PGD network 40. The communicating device 45 can be configured to power-up or bring additional generators online when demand increases, or power-down or offline generators when demand decreases.

Figure 2:
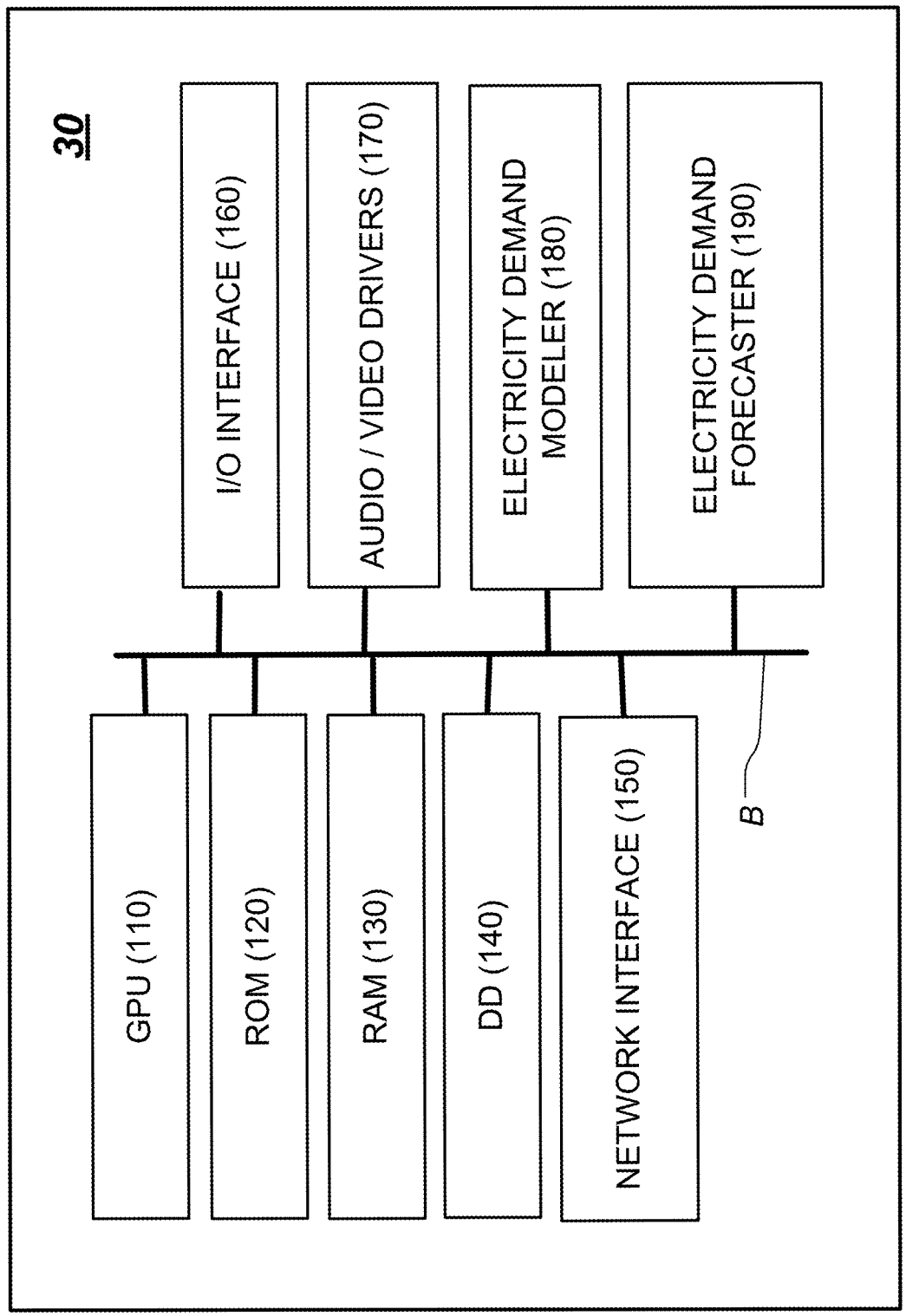
FIG. 2 shows a block diagram of a modeling and forecasting unit that can be included in the EDMF system in FIG. 1.

FIG. 2 shows a block diagram of a modeling and forecasting (MAF) unit 30 that is constructed according to the principles of the disclosure. The MAF unit 30 can include the preprocessor 20 (shown in FIG. 1). The MAF unit 30 can include a graphic processor unit (GPU) 110, a read-only memory (ROM) 120, a random-access memory (RAM) 130, a disk drive (DD) 140, a network interface 150, an input-output (I/O) interface 160, audio and video drivers 170, an electricity demand modeler 180, and electricity demand forecaster 190, each of which can be connected to a backbone B. The components in the MAF unit 30 can be connected to the backbone B via one or more communication links. The MAF unit 30 can be included in one or more servers (not shown), which can be located inside or outside the PGD network 40 (shown in FIG. 1).

The GPU 110 can be any of various commercially available processors. Dual microprocessors and other multi-processor architectures can be employed as the GPU 110. The GPU 110 can be a central processing unit (CPU).

Figure 3A:
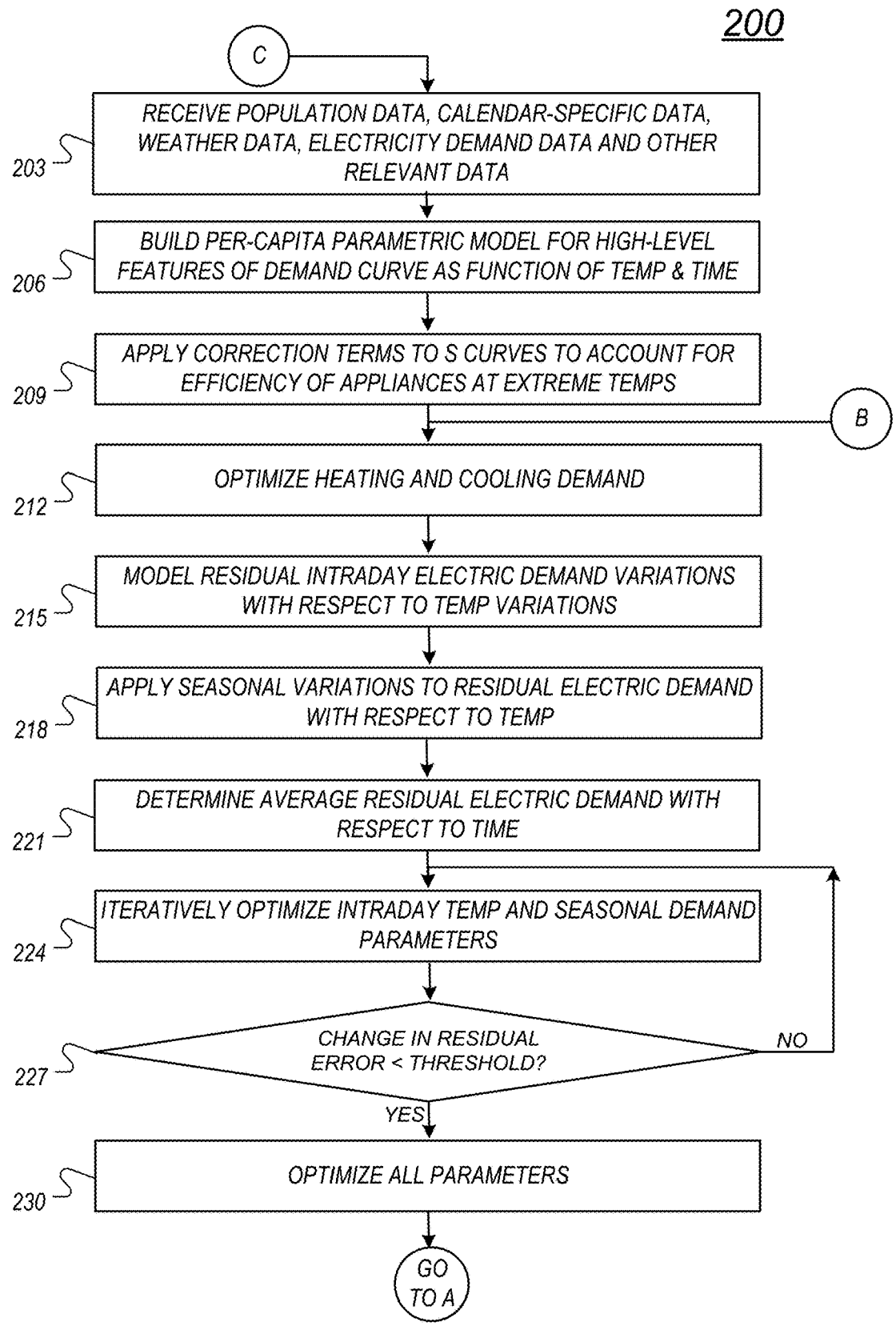
FIGS. 3A-3C show an embodiment of an electricity demand and forecasting process that can be carried out by the EDMF system in FIG. 1.
Figure 3B:
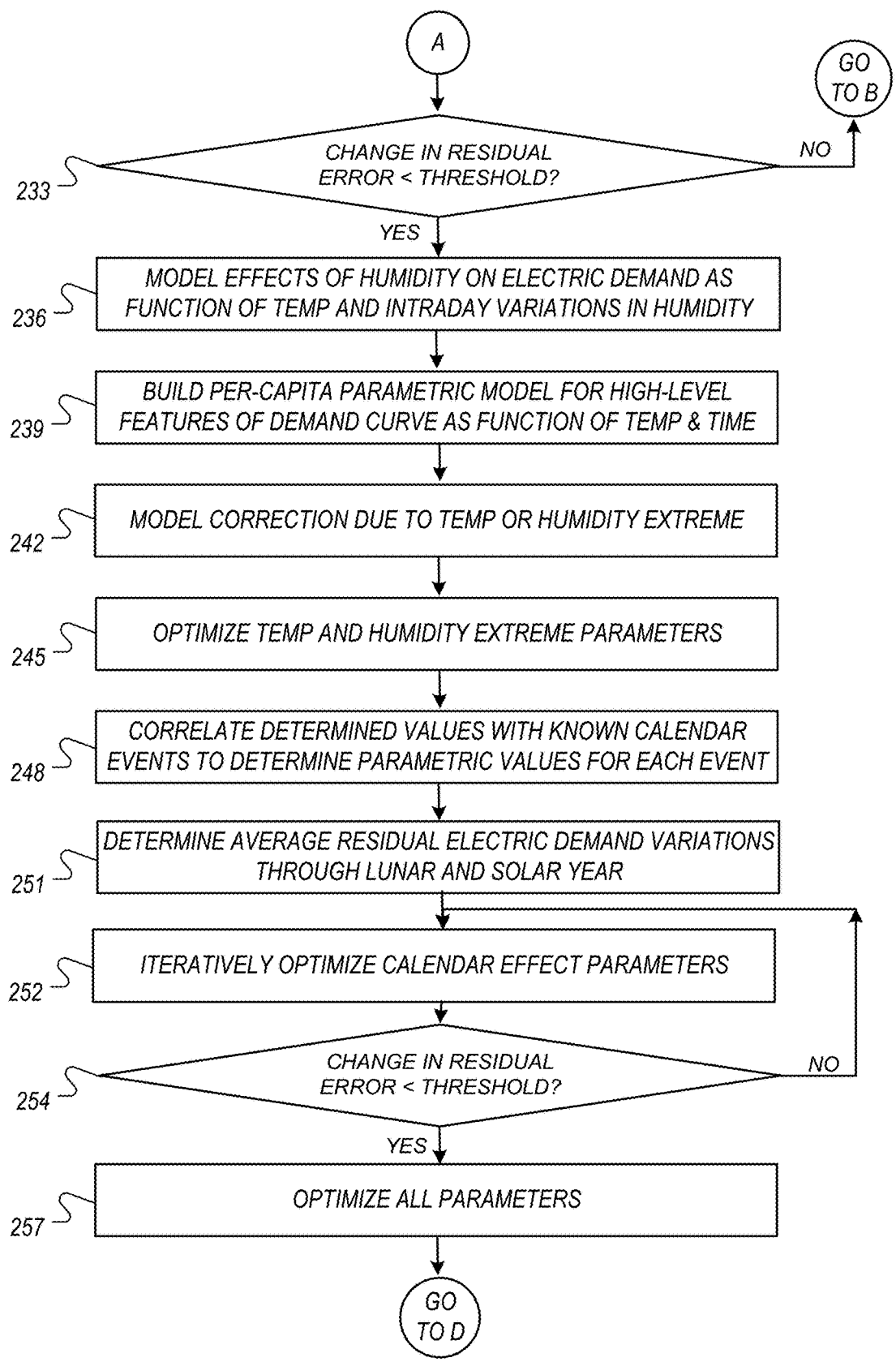
Figure 3C:
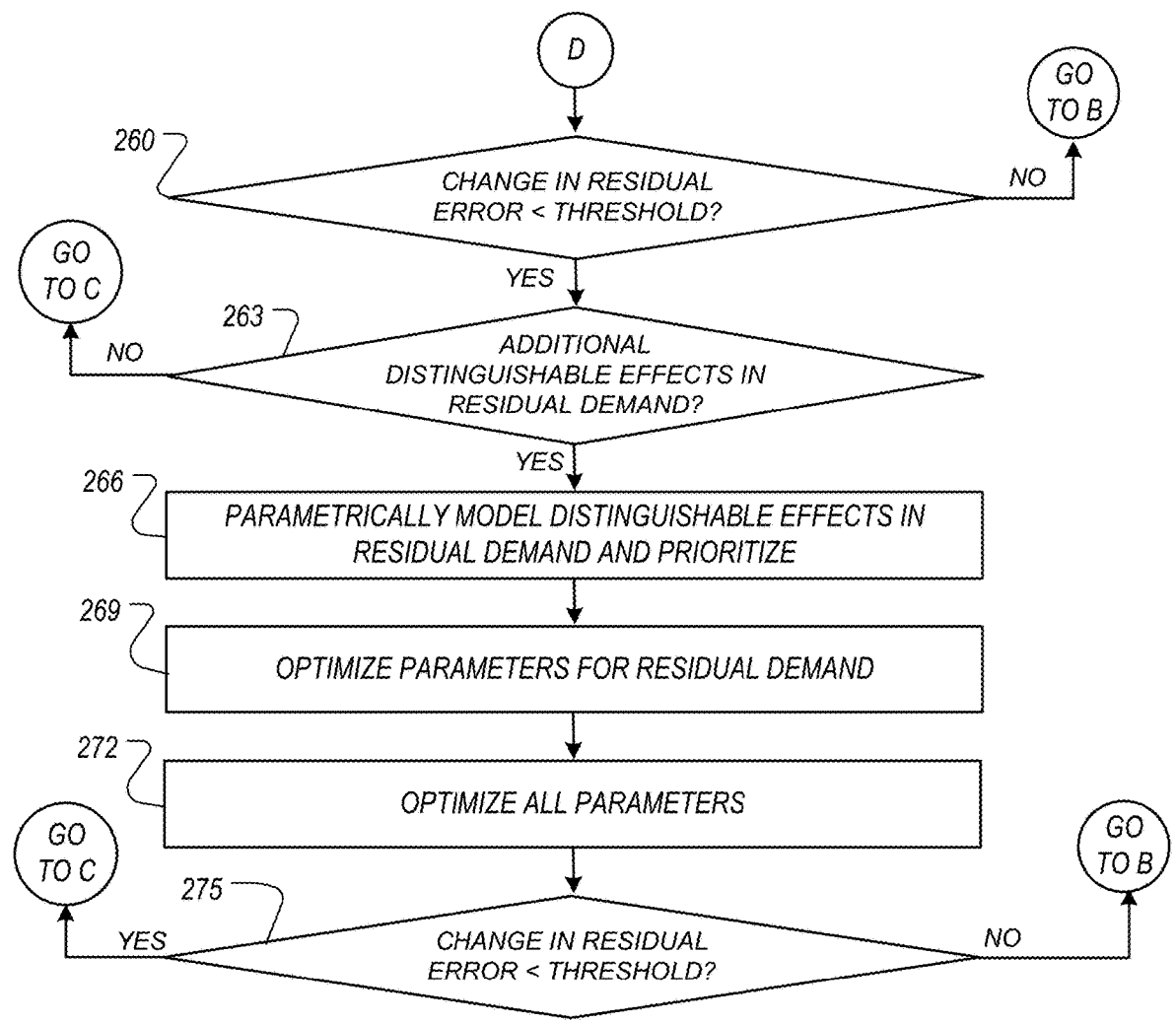

The MAF unit 30 can include a computer-readable medium that can hold executable or interpretable computer code (or instructions) that, when executed by the GPU 110, or electricity demand modeler 180, or electricity demand forecaster 190, cause the steps, processes and methods described in this disclosure to be carried out, including the process 200 (shown in FIGS. 3A to 3C). The computer-readable medium can be included in the ROM 120, RAM 130, DD 140, or an external computer-readable medium connected to the MAF unit 30 via the network interface 150 or the I/O interface 160. The computer readable medium can include sections of computer code that, when executed by the GPU 110, electricity demand modeler 180, or electricity demand forecaster 190, cause the process 200 (shown in FIGS. 3A-C) to be carried out, and all other process steps described or contemplated in this disclosure.

A basic input/output system (BIOS) can be stored in a non-volatile memory in the MAF unit 30, such as, for example, the ROM 120. The ROM 120 can include a ROM, an erasable programmable read-only memory (EPROM), or an electrically erasable programmable read-only memory (EEPROM). The BIOS can contain the basic routines that help to transfer information between computing resources within the EDMF unit 30, such as during start-up.

The RAM 130 can include a high-speed RAM such as static RAM for caching data, a parallel random-access machine, or any random-access storage. The RAM 130 can include a non-volatile RAM (NVRAM), a solid-state device (SSD) storage, or a burst buffer (BB) storage.

The disk drive (DD) 140 can include a hard drive, such as, for example, an enhanced integrated drive electronics (EIDE) drive, a serial advanced technology attachments (SATA) drive, or any other high capacity fast hard drive that might be available and that is suitable for application in the instant disclosure. The DD 140 can include an optical disk drive that can read/write from/to a compact disk read-only memory (CD-ROM) disk (not shown), or, read from or write to other high capacity optical media such as a digital video disk (DVD). The DD 140 can be configured for external use in a suitable chassis (not shown). The DD 140 can be connected to the backbone B by a hard disk drive interface (not shown) and an optical drive interface (not shown), respectively. The hard disk drive interface (not shown) can include a Universal Serial Bus (USB) (not shown) or an IEEE 1394 interface (not shown) for external applications.

The DD 140 and associated computer-readable media can provide nonvolatile storage of data, data structures, or computer-executable instructions. The DD 140 can accommodate the storage of any data in a suitable digital format. The DD 140 can include one or more apps that are used to execute aspects of the architecture described in this disclosure.

A variety of program modules can be stored in the DD 140, ROM 120, or RAM 130, including an operating system (not shown), one or more application programs (not shown), application program interfaces (APIs) (not shown), program modules (not shown), or program data (not shown). Any (or all) of the operating system, application programs, APIs, program modules, or program data can be cached in the RAM 130 as executable sections of computer code.

The network interface 150 can be connected to the PGD network 40 (shown in FIG. 1), the data sources 10 (shown in FIG. 1), or a communication network (not shown). The network interface 150 can include a wired or a wireless communication network interface (not shown) or a modem (not shown). When communicating in a local area network (LAN), the MAF unit 30 can be connected to the LAN network through the wired or wireless communication network interface; and, when communicating in a wide area network (WAN), the MAF unit 30 can be connected to the WAN network through the modem. The modem (not shown) can be internal or external and wired or wireless. The modem can be connected to the backbone B via, for example, a serial port interface (not shown).

The I/O interface 160 can receive commands and data from, for example, an operator via a user interface device (not shown), such as, for example, a keyboard (not shown), a mouse (not shown), a pointer (not shown), a microphone (not shown), a speaker (not shown), or a display (not shown). The received commands and data can be forwarded to the GPU 110, electricity demand modeler 180, or electricity demand forecaster 190, from the I/O interface 160 as instruction and data signals via the backbone B.

The audio and video drivers 170 can include a graphics driver (not shown), a video adaptor (not shown), a video card (not shown), a sound card (not shown), or any other device necessary to render an image signal on a display device or an audio signal on a sound reproduction device (for example, speaker). The audio and video drivers 170 can include interactive voice response (IVR) technology.

The network interface 150 can include a data parser (not shown) or the data parsing operation can be carried out by the GPU 110. Received data can be transferred from the network interface 150 to the GPU 110, the electricity demand modeler 180 or the electricity demand forecaster 190. The network interface 150 can facilitate communication between the electricity demand modeler 180 or electricity demand forecaster 190 and computing resources located external to the EDMF unit 30, such as, for example, computing resources located in the PGD network 40 (shown in FIG. 1). The network interface 150 can handle a variety of communication or data packet formats or protocols, including conversion from one or more communication or data packet formats or protocols used by data sources 10 (shown in FIG. 1) to the communication or data packet formats or protocols used in the EDMF unit 30.

The electricity demand modeler 180 can include a computing device or it can be included in a computing device as a module. The electricity demand modeler 180 can include a machine learning model such as, for example, an artificial neural network (ANN), a convolutional neural network (CNN), a recurrent neural network (RNN), a neural Turing machine (NTM), a differential neural computer (DNC), a support vector machine (SVM), or a deep learning neural network (DLNN). The electricity demand modeler 180 can analyze data received from various data sources 10 (shown in FIG. 1), such as, for example, weather data 10A, electricity demand data 10B, economic data 10C, and end user data 10D and generate a model that accurately describes the electricity demand for a geographic region.

The electricity demand forecaster 190 can include a computing device or it can be included in a computing device as a module. The electricity demand forecaster 190 can be integrated with the electricity demand modeler 180. The electricity demand forecaster 190 can include a machine learning model such as, for example, an ANN, CNN, RNN, NTM, DNC, SVM, DLNN. The electricity demand forecaster 190 can, for example, reference the electricity demand model generated by the electricity demand modeler 180 for a geographic region in the PGD network 40 (shown in FIG. 1) and output an electricity demand forecast for any date or time in the future for the region. The electricity demand forecaster 190 can include a reporting module (not shown) that can receive a date or date range and a time or time range and generate an electricity demand report for the period. The electricity demand forecaster 190 can initiate communication of the report to, for example, the communicating device 45 in the PGD network 40 (shown in FIG. 1). The report can be generated and transmitted to the communicating device 45 so as to be displayed using a graphic user interface (not shown) in the communicating device 45. The report can be generated and displayed on a display device (not shown) in the EDMF system 1 (shown in FIG. 1) via, for example the audio/video drivers 170 or I/O interface 160. FIGS. 4 to 26B show examples of plots or data tables that can be generated and rendered by the electricity demand forecaster 190.

FIGS. 3A to 3C show an embodiment of an electricity demand and forecasting process 200 that can be carried out by, for example, the MAF unit 30. However, before describing the process 200, a brief description follows regarding determinations that can be made by the MAF unit 30 or, more specifically, the electricity demand modeler 180 (shown in FIG. 2) that can be included in the modeling and forecasting unit 30. The electricity demand modeler 180 can predict an electricity demand per capita E for a geographical region in the PGD network 40 (shown in FIG. 1), which can be sent to, for example, the communication device 45 to modify electricity transmission parameters of the electrical power distributed in PGD network 40, including, for example, adjusting one or more setpoints in an automatic generation control (AGC) system (not shown) in one or more power generation stations (not shown), thereby adjusting the power output to end users in the PDG network 40.

According to a non-limiting embodiment, the MAF unit 30 can be configured to analyze the received weather data 10A, electricity demand data 10B, economic data 10C, and end user data 10D (shown in FIG. 1) and model an electricity demand per capita E for a geographical region in the PGD network 40 (shown in FIG. 1). The input data (for example, weather, population and demand data) can be cleaned and interpolated (for example, applying spatio-temporal interpolation techniques) before being analyzed by the MAF unit 30. The MAF unit 30 can model each variable that can affect the per-capita electricity demand E, which can be determined according to the following equation (1):

$$E = BASE(t) + e^{r_w t}(COOL(T, T_{avg}) + HEAT(T, T_{avg}) + ITV(T, T_{avg}) + HUM(H, H_{avg}, T_{avg}) - VAC(T, H, H_{avg}) + CAL_t) \quad (1)$$

where BASE(t) is a maximum base electricity load demand as a function of time t; $e^{r_w t}$ is the weather-specific growth rate as a function of time t (hourly); COOL(T,$T_{avg}$) is the cooling demand; HEAT(T,$T_{avg}$) is the heating demand; ITV(T,$T_{avg}$) is the intraday temperature variation correction; HUM(H, $H_{avg}$,$T_{avg}$) is the humidity "feels-like" correction; VAC(T, H,$H_{avg}$) is the vacation "extreme weather" correction; $CAL_t$ is the weekly, lunar and solar calendar correction; T is the population-weighted temperature; $T_{avg}$ is the daily average temperature; H is the population-weighted humidity; $H_{avg}$ is the daily average humidity; and t is time (e.g., in hours).

If, as is often the case, weather and population data is available for subregions of the region of interested (for example, for states within a given country), these can be combined to produce population-weighted temperature and humidity data for the entire region. Using the population-weighted temperature and humidity data can result in a more accurate model of electricity demand than using data from a single weather station or a simple regional averages of weather data, as electricity consumption is typically concentrated at the population centers. The population-weighted temperature and humidity data can also be used to develop future weather and population forecasts (range of possible methodologies not specified here) that can be used as inputs for the future electricity demand forecasts.

Often data sources can have quite variable coverage of the region of interest—for example, there are only around 50 weather stations listed in the NOAA data source for the whole of Saudi Arabia, which do not provide a particularly even coverage of the region—and, additionally there can be significant numbers of gaps in the data varying in length from one or two hours, to periods of weeks or months. There are standard methods that can be used to deal with such issues, as will be understood by those skilled in the art.

When developing a model of national electricity demand, weather data may be received from a relatively small number (for example, 40) weather stations scattered around the country. The electricity is likely to be be consumed mainly at the population centers (for example, large cities/industrial areas), and so the weather at those population centers can be given a greater weight (for example, proportional to their populations) as inputs to the model. It is often the case that populated areas do not have a weather station directly associated with them, and so a method is needed to estimate the weather at such locations. One way to do this is to use as a proxy the data from the nearest weather station (for example, as the crow flies), or one can use more sophisticated methods that combine the data from a number of nearby stations to come up with an improved estimate The maximum base load demand BASE(t) can be the demand that is always present in the region, irrespective of changes in weather conditions. In other words, maximum base load demand BASE(t) is not weather dependent. The maximum base load demand BASE(t) can be determined based on the following equation (2):

$$BASE(t) = D_b e^{r_b t} \quad (2)$$

where $D_b$ is the base electricity load demand and $e^{r_b}$ is the base load growth rate (hourly) as a function of time t (hours).

The cooling demand COOL(T,$T_{avg}$) can represent, for example, the cooling appliance (e.g., air-conditioning (AC)) cooling demand and cooling efficiency degradation, which can be determined based on the following equation (3):

$$COOL(T, T_{avg}) = \frac{D_c(1 + m_c(T - T_{room}) + q_c(T - T_{room})^2)}{1 + e^{-a_c(T_{avg} - T_c)}} \quad (3)$$

where $D_c$ is the base electricity load for cooling; $m_c$ is a linear cooling efficiency degradation coefficient; $T_{room}$ is the effective room temperature; $q_c$ is a quadratic cooling efficiency degradation coefficient; $a_c$ is a cooling uptake coefficient; and $T_c$ is the median cooling temperature.

The heating demand HEAT(T,$T_{avg}$) can represent the heating appliance (e.g., heating boiler, heat pump, electric radiator, electric stove) demand and heating efficiency degradation. The heating demand can be determined based on the following equation (4):

$$HEAT(T, T_{avg}) = \frac{D_h(1 + m_h(T_{room} - T))}{1 + e^{-a_h(T_h - T_{avg})}} \quad (4)$$

where $D_h$ is the base electricity load for heating; $m_h$ is a linear heating efficiency degradation coefficient; $a_h$ is a heating uptake coefficient; and $T_h$ is the median heating temperature. It is noted that a quadratic heating efficiency degradation coefficient can be added, as well. This may not be particularly necessary in warm countries such as Saudi Arabia where heating appliances tend to be moveable and of a simple "on-off" type, but could be relevant in colder countries such as Scotland or Canada where buildings often have temperature controlled central heating.

Figure 4:
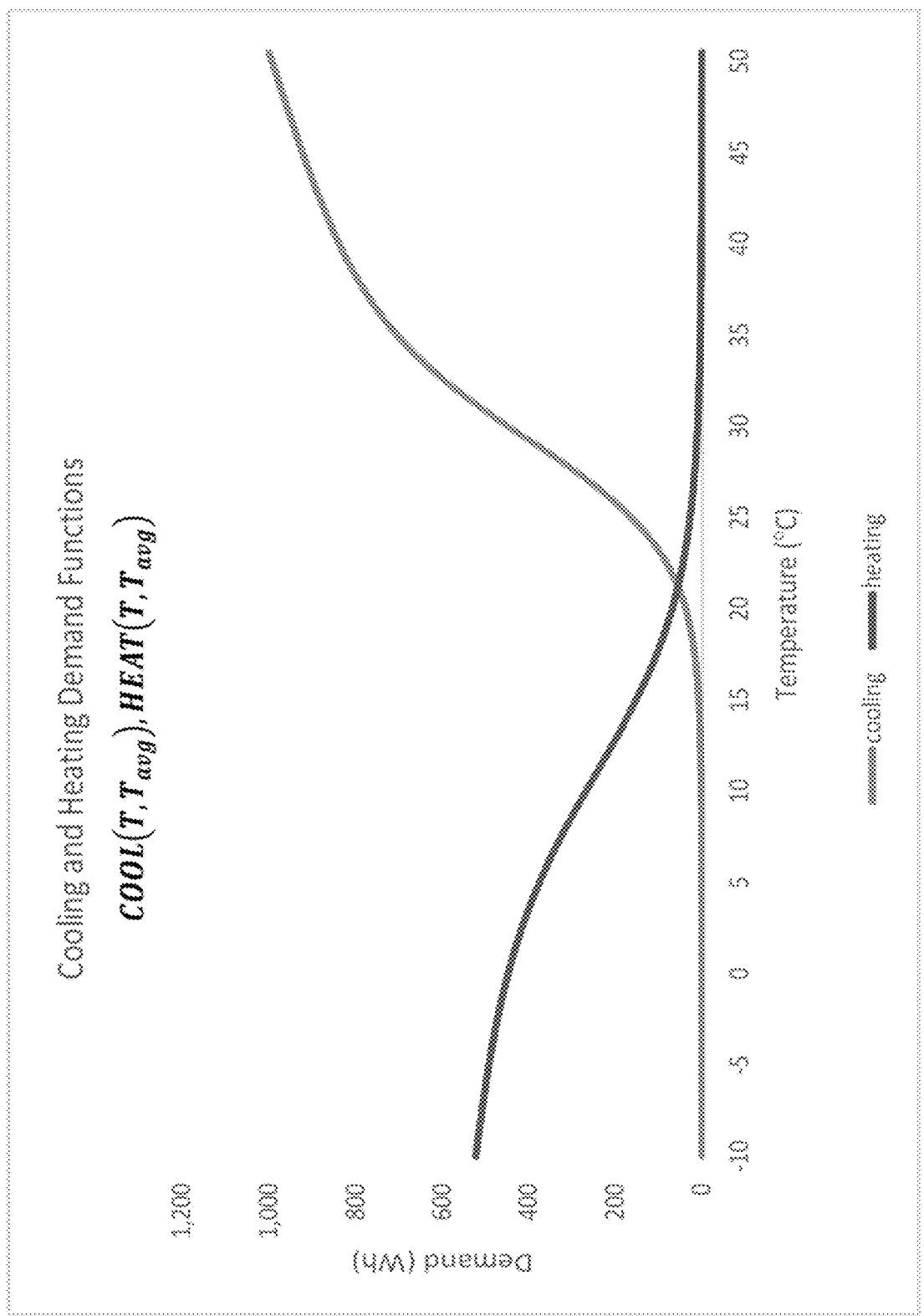
FIG. 4 shows a diagram that illustrates examples of cooling and heating demand functions, according to the principles of the disclosure.

FIG. 4 shows a diagram that illustrates examples of cooling and heating demand functions determined using equations (3) and (4). As seen in the diagram, the cooling demand COOL(T,$T_{avg}$) is determined to be at or near zero (0) for temperatures less than about 17° C., after which it increases to about 1 kWh. On the other hand, the heating demand HEAT(T,$T_{avg}$) is determined to be about 0.5 kWh at −10° C., decreasing according to the curve in FIG. 4 to about 0 Wh when the temperature exceeds 25° C.

Figure 5:
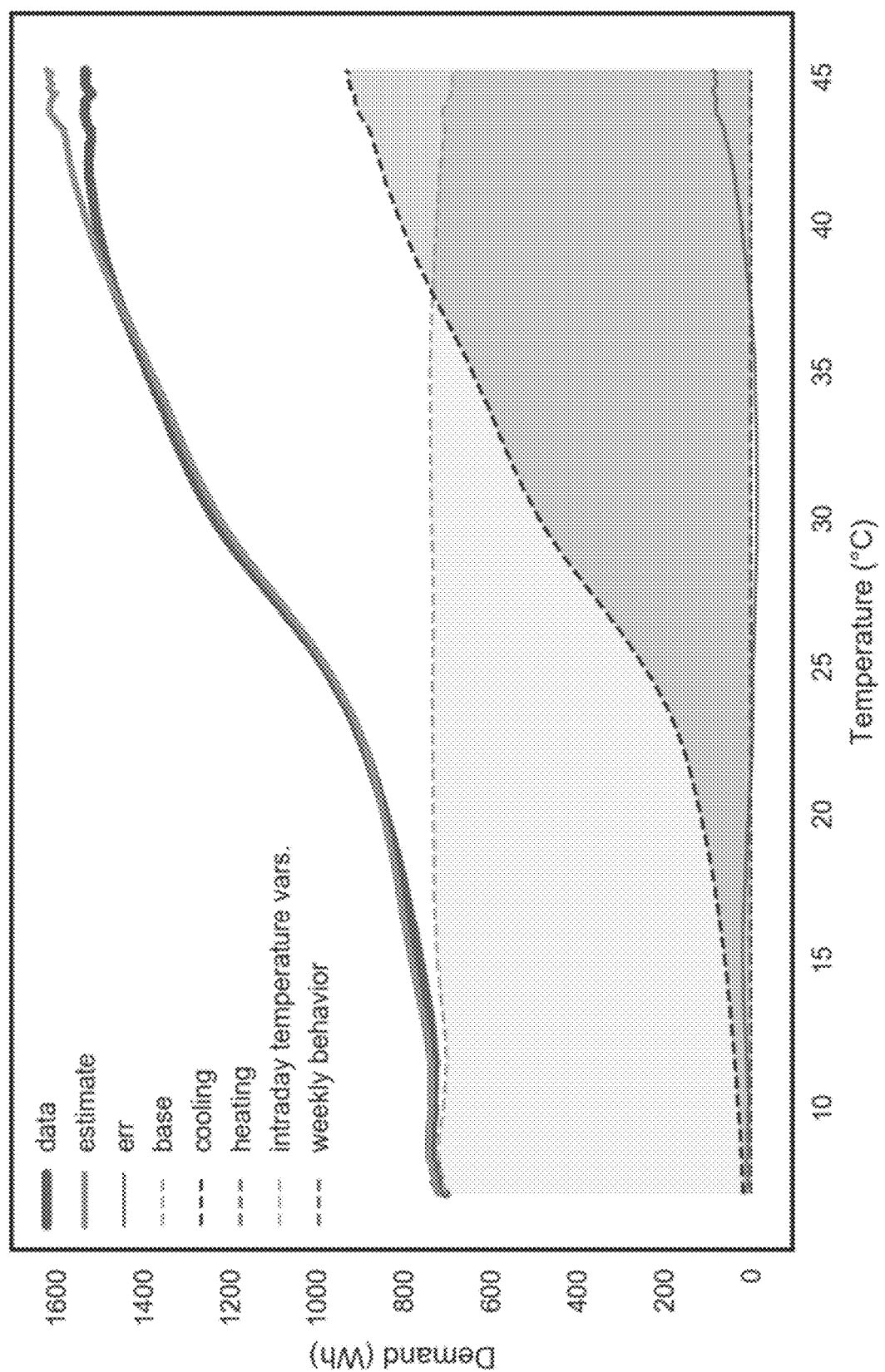
FIG. 5 shows a diagram illustrating a breakdown of aggregated per-capita electricity demand, according to the principles of the disclosure.

FIG. 5 shows a diagram that illustrates an example of a breakdown of aggregated per-capita electricity demand, including an example of each modeled component (or high-level) feature, against temperature for the cooling demand function modeled. As seen, the modeled high-level features can include actual data ("data"), estimated electricity demand E ("estimate"), growth rate $e^{r_w t}$ ("err"), BASE(t) ("base"), COOL(T,$T_{avg}$) ("cooling"), HEAT(T,$T_{avg}$) ("heating"), ITV(T,$T_{avg}$) ("intraday temperature vars."), and $CAL_t$ ("weekly behavior"). The modeled cooling demand function (excluding heating for now), in addition to base load, can produce the estimated electricity demand shown in FIG. 5. The diagram illustrates an overall estimate as well as a breakdown of this estimate where base load and cooling functions are switched ON. The additional terms such as heating, intraday temperature variations and weekly behavior are assumed to be switched OFF for now for sake of simplicity, but are considered as switched ON in discussions below.

Figure 6:
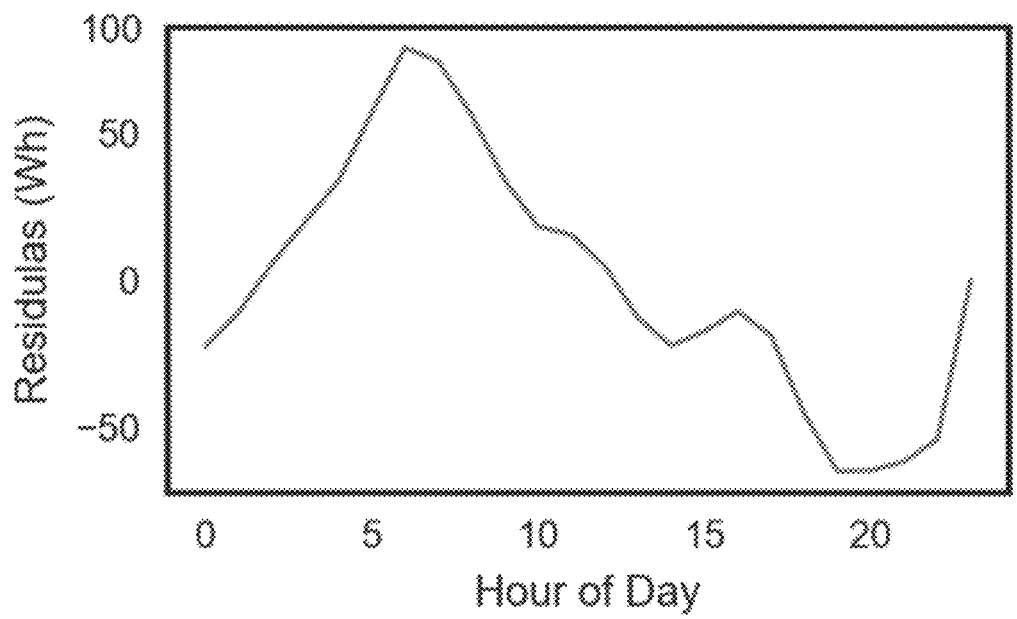
FIG. 6 shows examples of plots of average error (model demand residuals), according to the principles of the disclosure.
Figure 6:
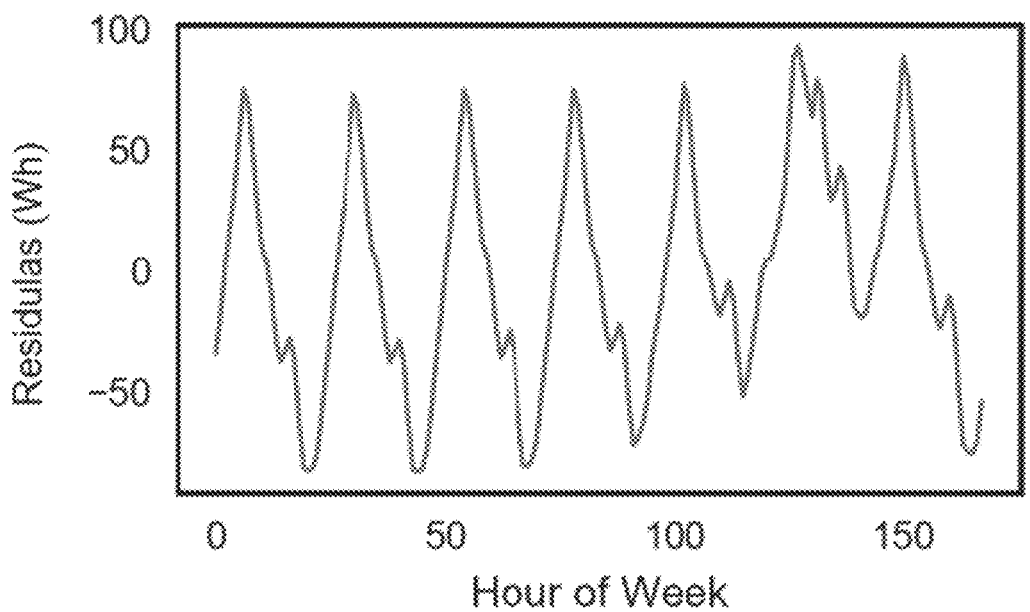

FIG. 6 shows plots of a pair of examples of average error (model demand residuals) in terms of estimating per capita electricity consumption in Watt-hours (Wh). The upper plot is an example of average error (modeled demand residuals) plotted against the hour of day. The lower plot is an example of average error (modeled demand residuals) plotted against the hour of week.

Figure 7:
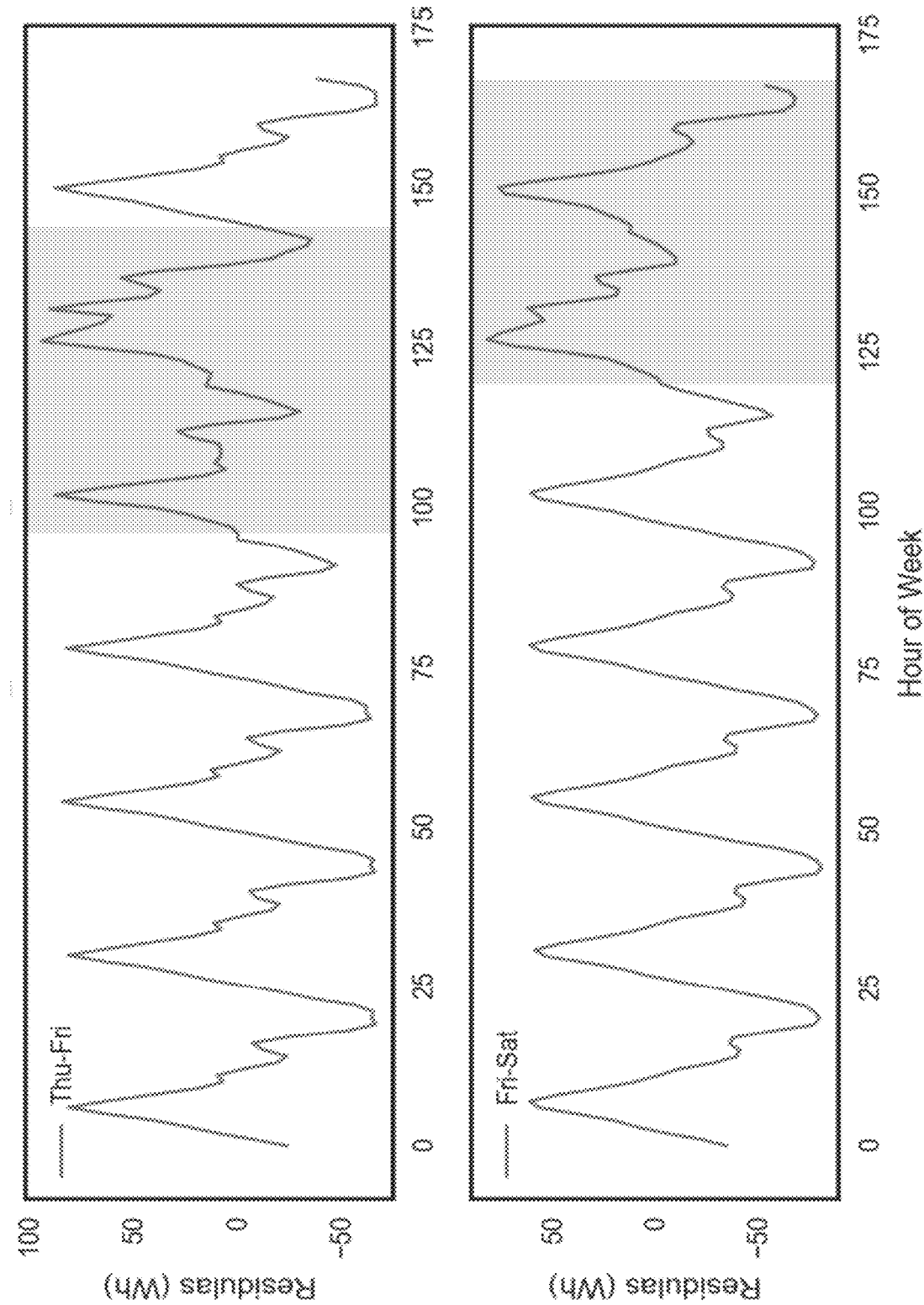
FIG. 7 shows further examples of plots of average error (model demand residuals), according to the principles of the disclosure.

FIG. 7 shows plots of a pair of examples of average error (model demand residuals) in terms of estimating per capita electricity consumption (Wh) over hour of week before and after a weekend shift (e.g., with the week starting on Sunday). As seen in the plots, where the geographic region shifted to Friday and Saturday from Thursday and Friday (assuming the week started from Sunday), demand residuals can be observed to be behaviorally-dependent. To address overestimates, a calendar effect function $CAL_t$ can be determined that takes into consideration a human behavior correction. The calendar effect function $CAL_t$ can be determined based on the following equations (5) and (5.1) to (5.3):

$$CAL_t = CAL_w + CAL_l + CAL_s \quad (5)$$

$$CAL_w = f(T, t_w) \quad (5.1)$$

$$CAL_l = f(t_l) \quad (5.2)$$

$$CAL_s = f(t_s) \quad (5.3)$$

where $CAL_w$ is the weekly correction function, $CAL_l$ is the lunar calendar correction function, where is the solar calendar correction function, $t_w$ is the hour of week, ti is the hour of the lunar calendar year, and $t_s$ is the hour of the solar calendar year. This correction approach can provide an average over the estimated demand residuals within a specific time period. For example, in the weekly correction function, the average error can be determined for a specific hour of week and a specific temperature within a reasonable range.

Average residual variations in demand can be determined throughout the lunar and solar year, and the results can be correlated with known holiday periods (e.g., spring break, summer holidays, Christmas holidays, or the two Eids), religious events (e.g., Hajj, Ramadan, Easter) and special events (e.g., national days, soccer world cup finals, Miss World beauty contest, or Olympics) to derive parametric models of the effects of each.

Figure 8:
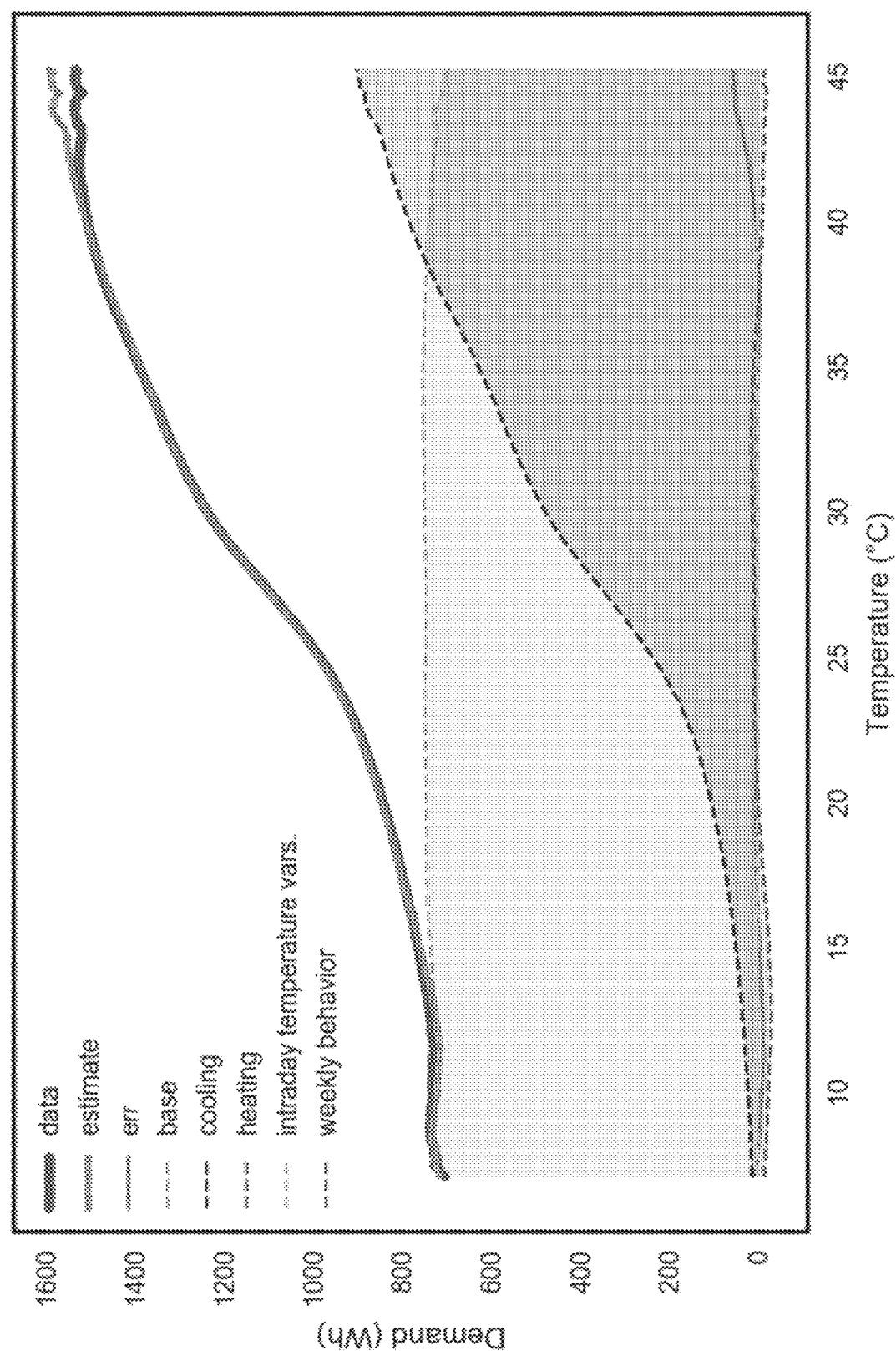
FIG. 8 shows a diagram illustrating a further breakdown of aggregated per-capita electricity demand, according to the principles of the disclosure.

FIG. 8 shows a diagram that illustrates an example of the breakdown of aggregated per-capita electricity demand, including an example of each modeled component, against temperature for the base, cooling, AC degradation and weekly demand functions. Similar to the diagram in FIG. 5, the modeled components can include actual data, estimated electricity demand, growth rate, base, cooling, heating, intraday temperature variations, and weekly behavior.

Figure 9:
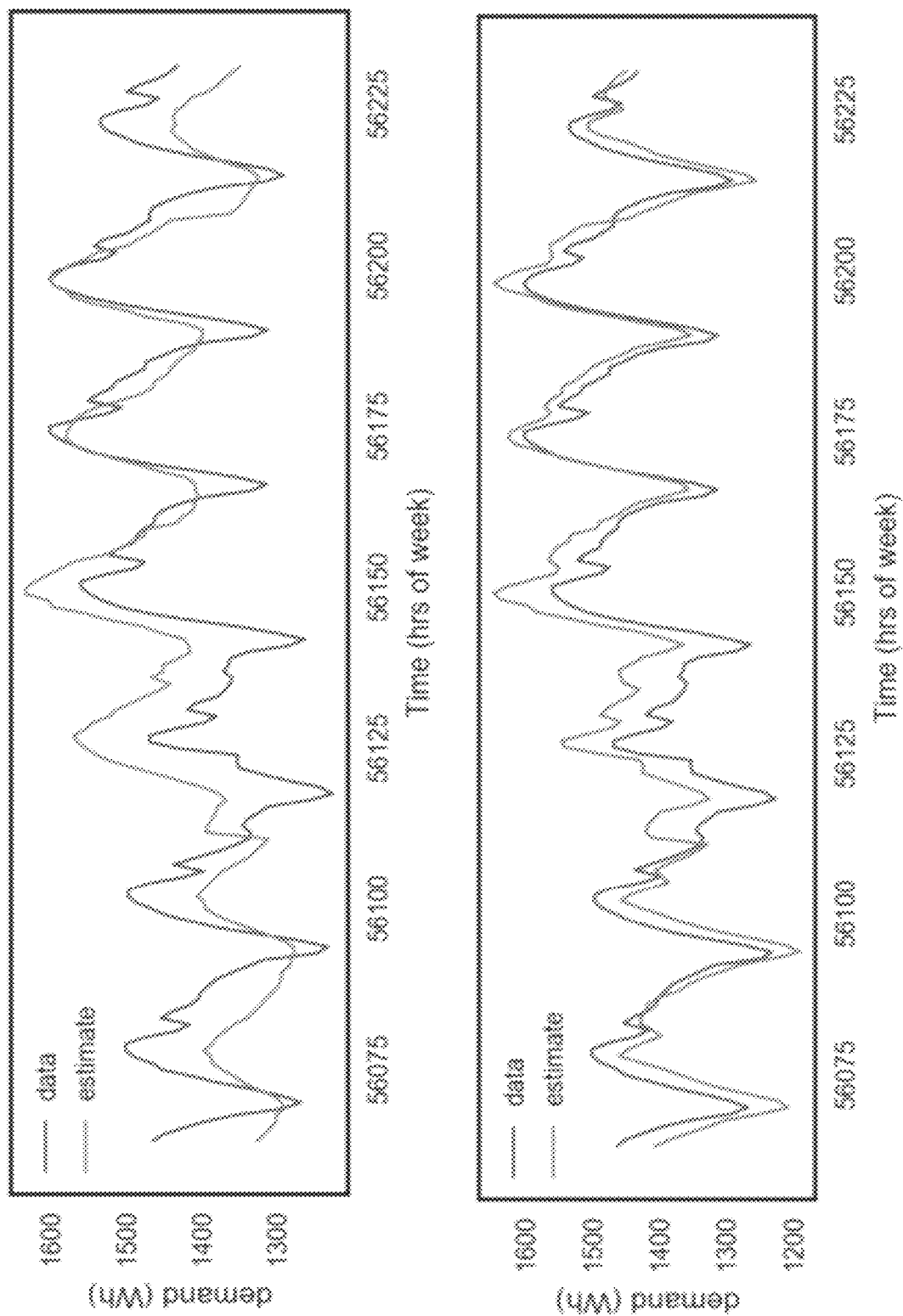
FIG. 9 shows examples of plots of actual-versus-estimated weekly electricity demand before and after adding a calendar effect correction, according to the principles of the disclosure.

FIG. 9 shows plots of a pair of examples of actual-versus-estimated weekly electricity demand (Wh) before and after adding a calendar correction $CAL_t$. The upper diagram shows a plot of the actual-versus-estimated weekly demand, without a calendar correction $CAL_t$, against hour of week for a week that begins after hour 56,075 and ends before hour 56,255 of the calendar year. It is noted that in this example, hour 0 can correspond to midnight of Jan. 1, 2010. The lower diagram shows a plot of the actual-versus-estimated weekly demand, with calendar correction $CAL_t$, against hour of week for same week.

Intraday temperature variation correction term ITV(T, $T_{avg}$) can be taken into consideration in order to separate weekly behavior-dependent cyclicality from weather-dependent cyclicality. There can be interaction between the ITV (T,$T_{avg}$) and weekly calendar terms $CAL_t$, as there can be periodic intraday variations both due to the temperature fluctuations and behavior of humans travelling between, for example, home and work. The intraday variations can be determined based on the following equation (6):

$$ITV(T,T_{avg}) = (S'_{min} + (S'_{max} - S'_{min})\tan h^2(a'(T-T_{avg})))$$
$$(T-T_{avg})(E_{cs}(T)(1-E_c(T_{avg})) +$$

$$R_{ch}E_{hs}(T)(1-E_h(T_{avg}))) \quad (6)$$

where $R_{ch}$ is the ratio of heating demand to cooling demand, S' is the seasonal sensitivity (e.g., human body sensitivity) to intraday temperature variation, $E_{cs}$ is the cooling required envelope function (representative of a system's capacity (e.g., human's capacity) to react to intraday temperature variations related to cooling), $E_{cs}$ is the heating required envelope function (representative of a system's capacity (e.g., human's capacity) to react to intraday temperature variations related to heating), a' is a seasonal sensitivity variation coefficient function, $E_c$ is a cooling coefficient, and $E_h$ is a heating coefficient.

The seasonal sensitivity to intraday temperature variation can be determined based on the first half of equation (6), namely the following equation (7):

$$(S'_{min} + (S'_{max} - S'_{min})\tan h^2(a'(T-T_{avg})))(T-T_{avg}) \quad (7)$$

The system's capacity to reach to this temperature variation, given its sensitivity, can be determined by the second half of equation (6), namely the following equation (8):

$$(E_{cs}(T)(1-E_c(T_{avg})) + R_{ch}E_{hs}(T)(1-E_{hs}(T_{avg}))) \quad (8)$$

Taking a deeper look into the relationship expressed in equation (7), after modeling the base electricity load, including cooling and heating components, the residual demand can be determined as a function of temperature change.

Figure 10:
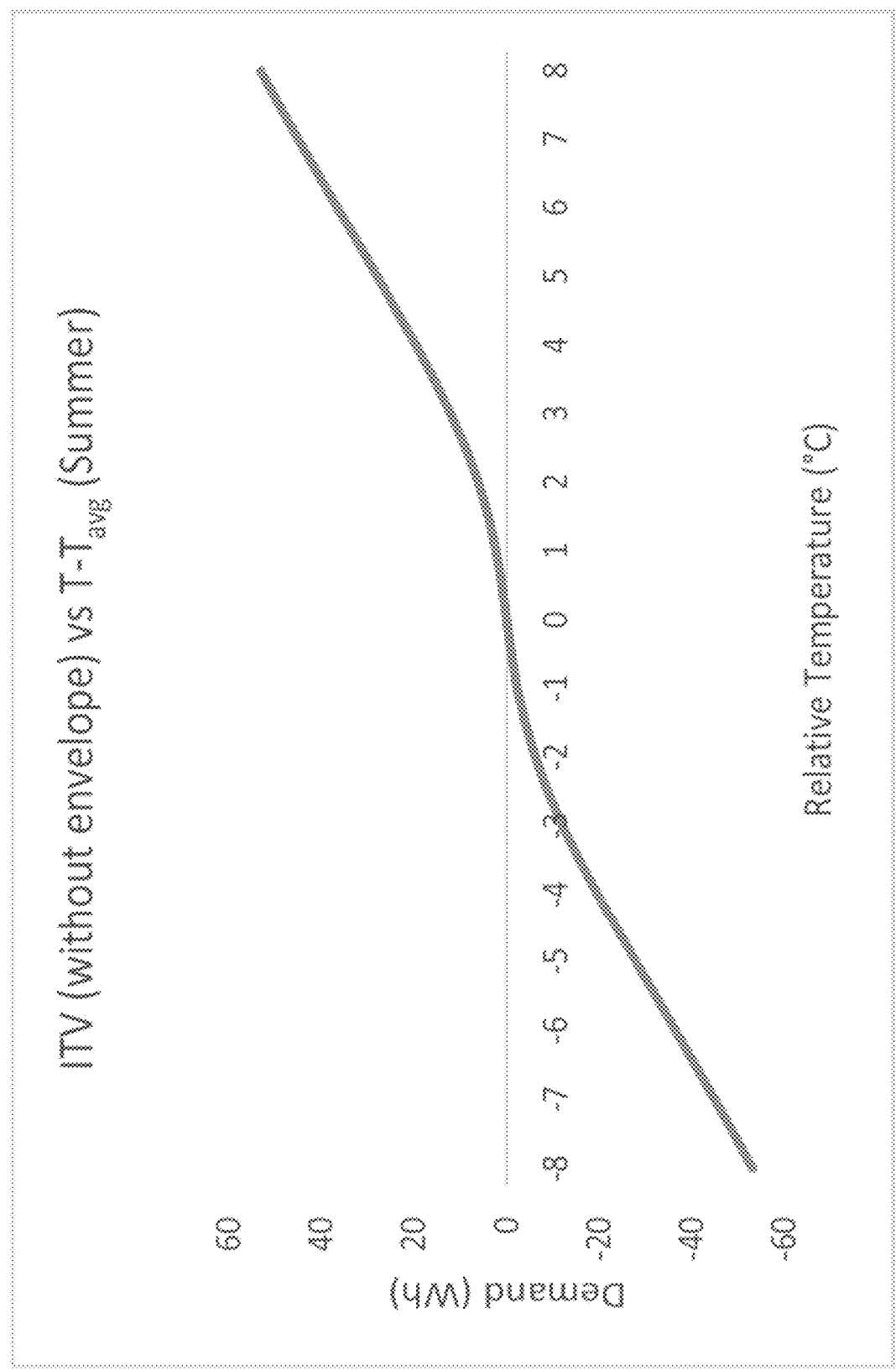
FIG. 10 shows an example of a plot of electricity demand against relative temperature, according to the principles of the disclosure.

FIG. 10 shows a plot of an example of electricity demand (Wh) against relative temperature (° C.), showing an example of intraday temperature variations as determined according to equation (10), where $S'_{max}$ is greater than $S'_{min}$. The plot shows an example of intraday temperature variation ITV(T,$T_{avg}$) (without envelope) against T-$T_{avg}$ during a summer period in the geographic region. To identify the functional form of the diagram in FIG. 10, an intraday temperature variations' slope can be plotted against the relative temperature, such as, for example, during the summer in the geographic region.

Figure 11:
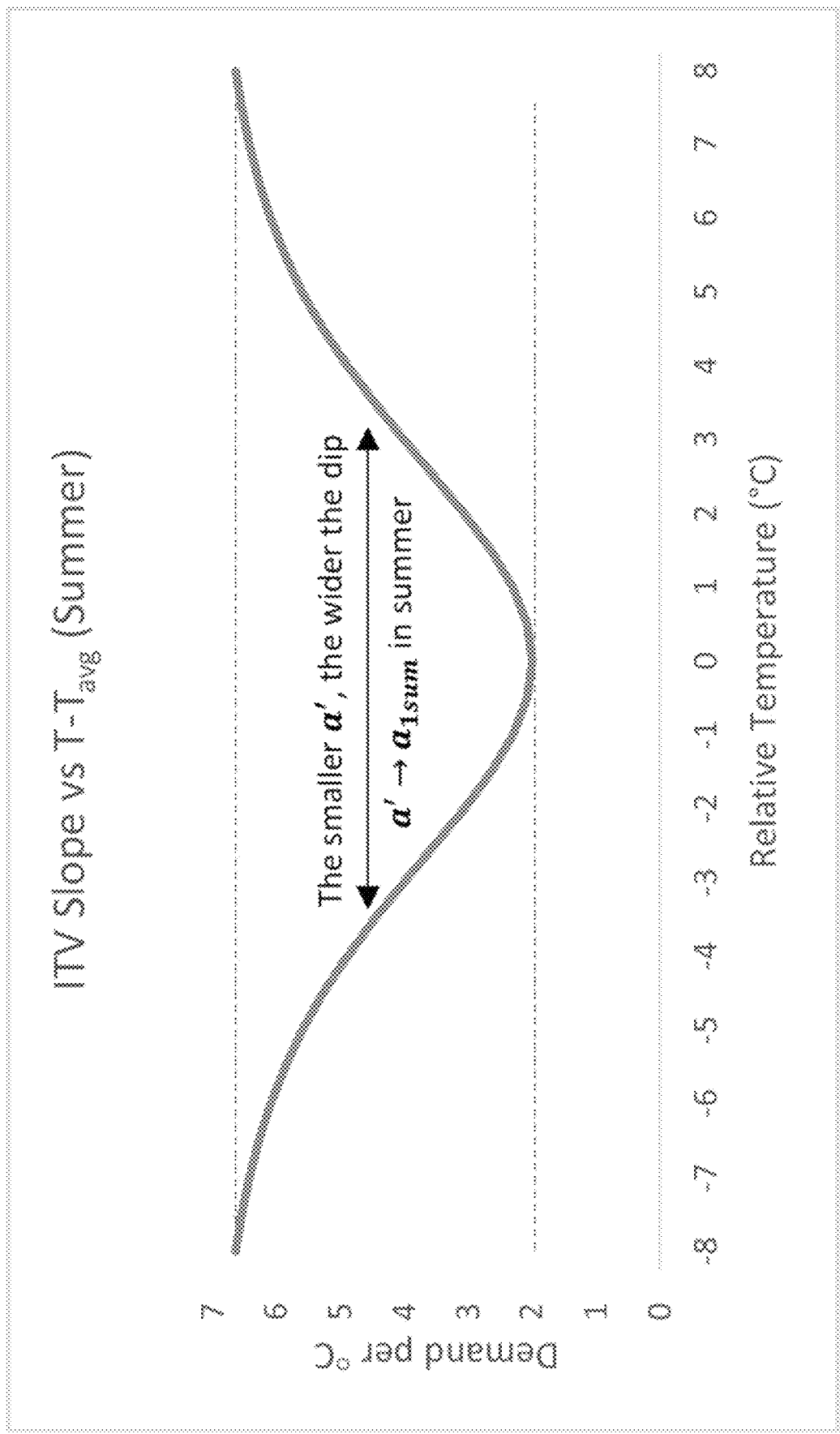
FIG. 11 shows an example of a plot of electricity demand per degree centigrade against the relative temperature during a summer in a geographic region, according to the principles of the disclosure.

FIG. 11 shows a plot of an example of electricity demand per degree centigrade (° C.) against the relative temperature during the summer in the geographic region. The plot includes an example of intraday temperature variation ITV slope against T-$T_{avg}$ during the summer period in the geographic region. The seasonal sensitivity variation coefficient a' is related to the spread of the dip in the curve, as seen in FIG. 11. The smaller the value of a', the wider the dip. As seen in FIG. 11, the curve, which is plotted based on a determination using equation (10), has a minimum seasonal sensitivity $S'_{min}$ value of 2 in this example ($S'_{min}$=2), and a maximum seasonal sensitivity $S'_{max}$ value of 7 ($S'_{max}$=7).

Figure 12:
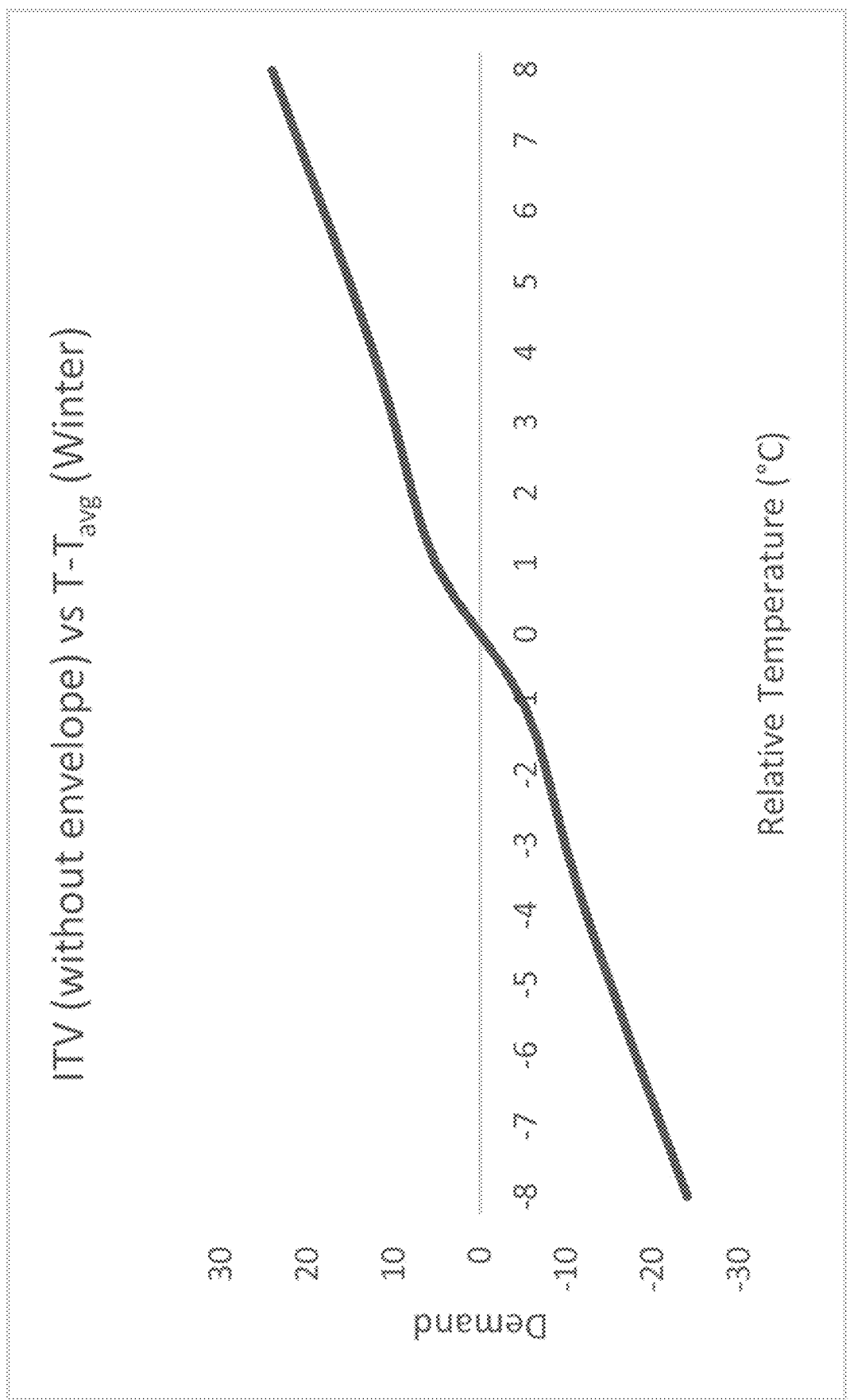
FIG. 12 shows a further example of a plot of electricity demand against relative temperature, according to the principles of the disclosure.

FIG. 12 shows a plot of an example of electricity demand (Wh) against relative temperature (° C.), showing an example of intraday temperature variations as determined according to equation (10), where $S'_{max}$ is less than $S'_{min}$. The plot includes an example of intraday temperature variation $ITV(T, T_{avg})$ against $T-T_{avg}$ during a winter period in the geographic region. To identify the functional form of the diagram in FIG. 12, an intraday temperature variations' slope can be plotted against the relative temperature, such as, for example, during the winter in the geographic region.

Figure 13:
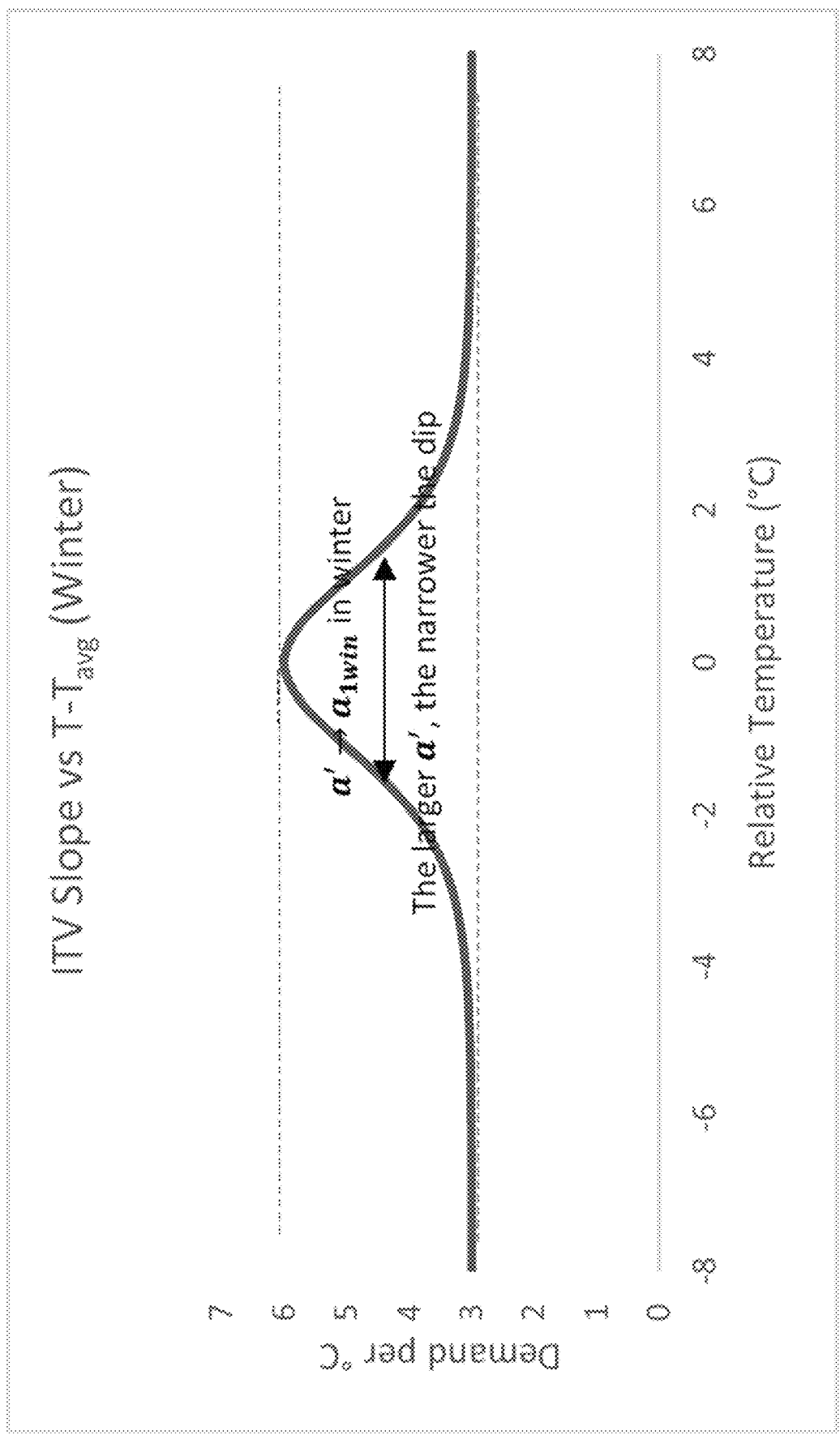
FIG. 13 shows an example of a plot of electricity demand per degree centigrade against relative temperature during a winter in the geographic region, according to the principles of the disclosure.

FIG. 13 shows a plot of an example of electricity demand per degree centigrade (° C.) against the relative temperature during the winter in the geographic region. The plot includes an example of intraday temperature variation ITV slope against $T-T_{avg}$ during the winter period in the geographic region. The seasonal sensitivity variation coefficient a' is related to the spread of the dip in the curve, as seen in FIG. 11. The larger the value of a', the narrower the dip. As seen in FIG. 13, the curve, which is plotted based on a determination using equation (7), has a minimum seasonal sensitivity $S'_{min}$ value of 6 in this example ($S'_{min}$=6), and a maximum seasonal sensitivity $S'_{max}$ value of 3 ($S'_{max}$=3).

The minimum and maximum seasonal sensitivity functions $S'_{min}$, $S'_{max}$, and the intraday sensitivity variation coefficient function a' can be determined based on the following equations (9.1) to (9.3):

$$S'_{min}(T_{avg})=W_{max}+(S_{min}-W_{max})[\tfrac{1}{2}(1+\tan h(a_0(T_{avg}-T_{spring})))] \quad (9.1)$$

$$S'_{max}(T_{avg})=W_{min}+(S_{max}-W_{min})[\tfrac{1}{2}(1+\tan h(a_0(T_{avg}-T_{spring})))] \quad (9.2)$$

$$a'(T_{avg})=a_{1win}+(a_{1sum}-a_{1win})[\tfrac{1}{2}(1+\tan h(a_0(T_{avg}-T_{spring})))] \quad (9.3)$$

where $W_{min}$ is the winter minimum intraday temperature sensitivity, $W_{max}$ is the winter maximum intraday temperature sensitivity, $S_{min}$ is the summer minimum intraday temperature sensitivity, $S_{max}$ is the summer maximum intraday temperature sensitivity, $T_{spring}$ is the effective springtime temperature, $a_{1win}$ is the winter intraday sensitivity variation coefficient, $a_{1sum}$ is the summer intraday sensitivity variation coefficient, and $a_0$ is the seasonal sensitivity variation coefficient. The coefficient $a_0$ can determine how slowly (if $a_0$ is small) or quickly (if $a_0$ is large) the curves of $S'_{min}(T_{avg})$ and $S'_{max}(T_{avg})$ interpolate from their initial to their final values as the season changes from winter to summer.

Figure 14:
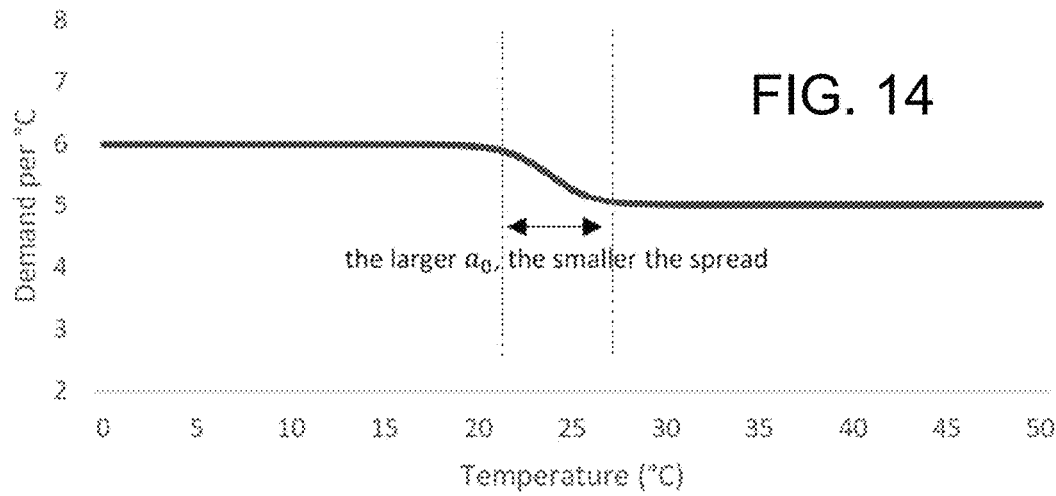
FIG. 14 shows an example of a plot of electricity demand per degree centigrade against relative temperature, having small seasonal deviations from average temperature, according to the principles of the disclosure.
Figure 15:
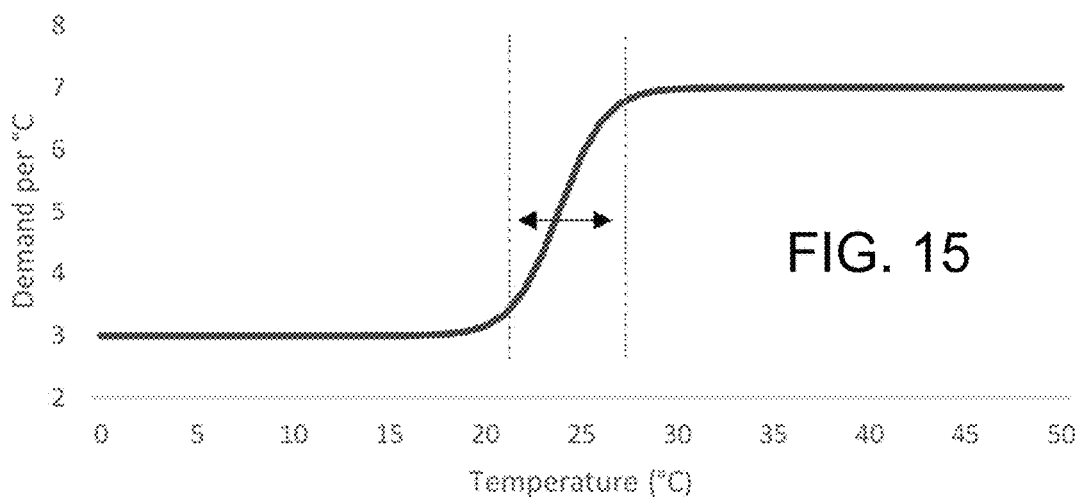
FIG. 15 shows an example of a plot of electricity demand per degree centigrade against relative temperature, having large seasonal deviations from average temperature, according to the principles of the disclosure.

FIGS. 14 and 15 show examples of winter-to-summer $W_{max}$-$S_{min}$ and $W_{min}$-$S_{max}$ interpolations using equations (9.1) and (9.2), respectively. As seen in the diagrams for this example, the latter interpolation based on equation (9.2) (shown in FIG. 15, going from $W_{min}$=3 to $S_{max}$=7) changes much more quickly, with larger seasonal deviations from average temperature, than the former interpolation based on equation (9.1) (shown in FIG. 14, going from $W_{max}$=6 to $S_{min}$=5), which has smaller seasonal deviations from average temperature for the geographic region.

The winter and summer intraday sensitivity variations function $a'(T_{avg})$ can interpolate from $a_{1win}$ to $a_{1sum}$ in the same way that $S'_{min}(T_{avg})$ and $S'_{max}(T_{avg})$ interpolate from their initial to their final values as the season changes from winter to summer, shown in FIGS. 14 and 15.

The system capacity $E_{cs}(T)$ to reach to a temperature variation, given its sensitivity, can be determined based on the aggregation of cooling-related equations (9.4) and (9.5) and heating-related equations (9.6) and (9.7):

$$E_{cs}(T) = \frac{1}{1 + e^{-a_{cs}(T-T_{cs})}} \quad (9.4)$$

$$E_c(T_{avg}) = \frac{1}{1 + e^{-a_c(T_c-T_{avg})}} \quad (9.5)$$

$$E_{hs}(T) = \frac{1}{1 + e^{-a_{hs}(T_{hs}-T)}} \quad (9.6)$$

$$E_h(T_{avg}) = \frac{1}{1 + e^{-a_h(T_{avg}-T_h)}} \quad (9.7)$$

where $a_{cs}$ is the cooling start uptake coefficient, $T_{cs}$ is the cooling start temperature, $a_c$ is the cooling saturation coefficient, $T_c$ is the cooling saturation temperature, $a_{hs}$ is the heating start uptake coefficient, $T_{hs}$ is the heating start temperature, $a_h$ is the heating saturation coefficient, and $T_h$ is the heating saturation temperature. Equations (9.4) and (9.6) can describe a system's (e.g., a human's) need for cooling and heating, respectively, and equations (9.5) and (9.7) can describe the system's capacity to cool and heat, respectively.

Figure 16:
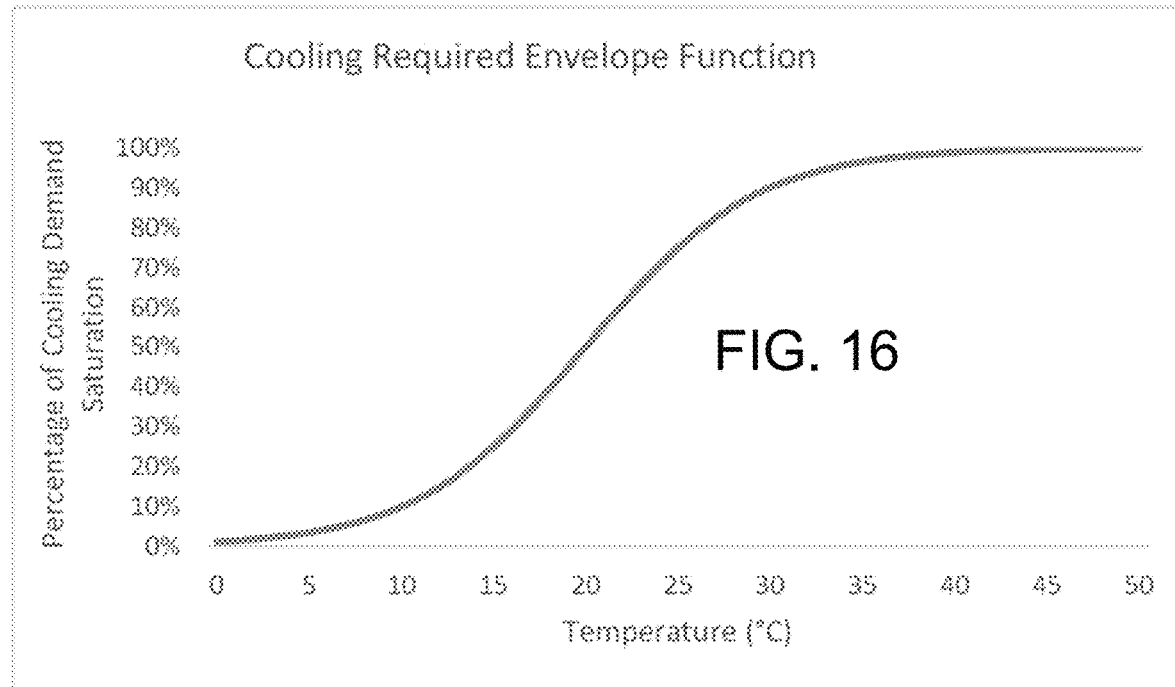
FIG. 16 shows an example of a cooling required envelope function curve, according to the principles of the disclosure.
Figure 17:
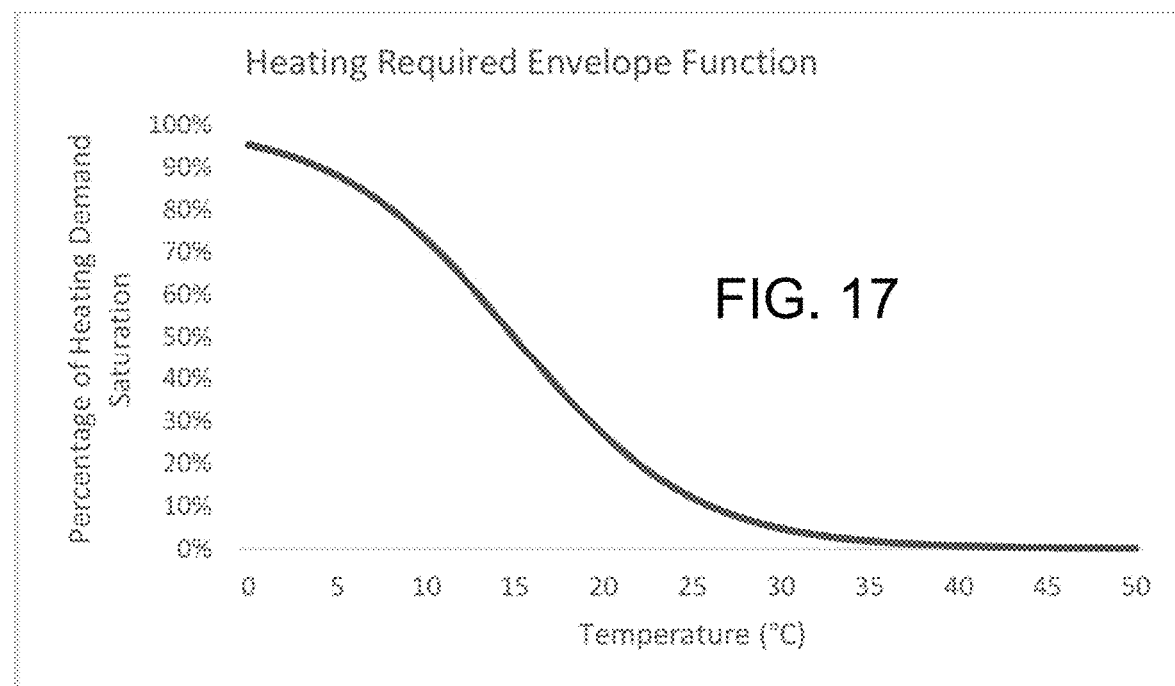
FIG. 17 shows an example of a heating required envelope function curve, according to the principles of the disclosure.
Figure 18:
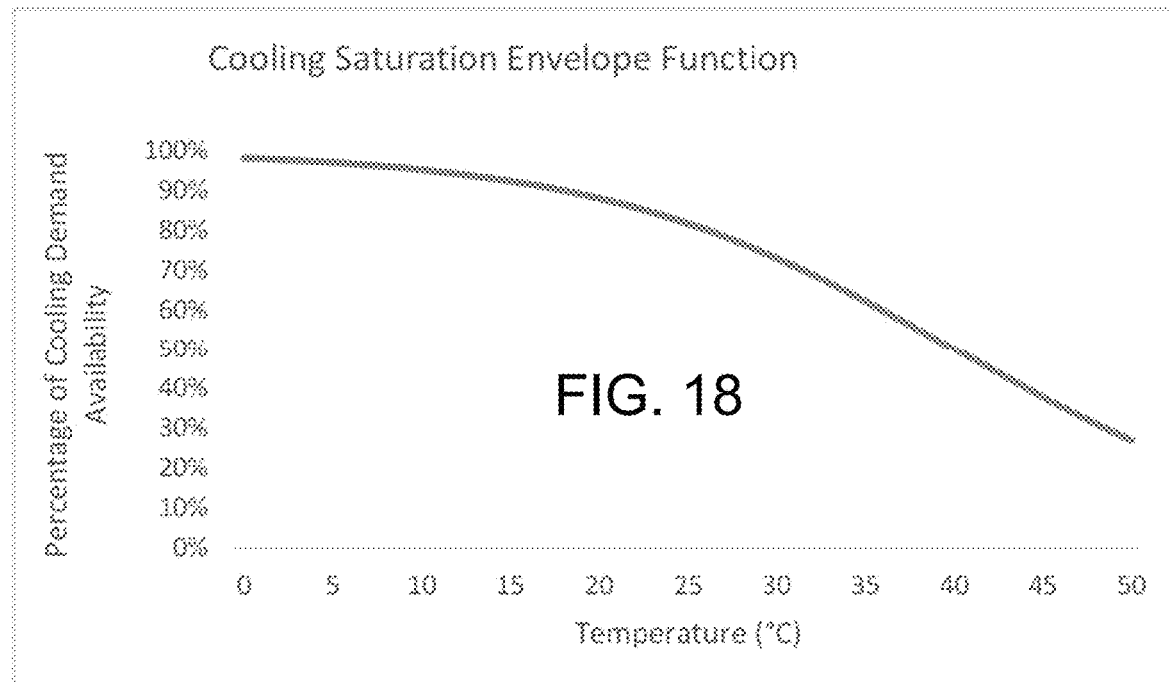
FIG. 18 shows an example of a cooling saturation envelope function curve, according to the principles of the disclosure.
Figure 19:
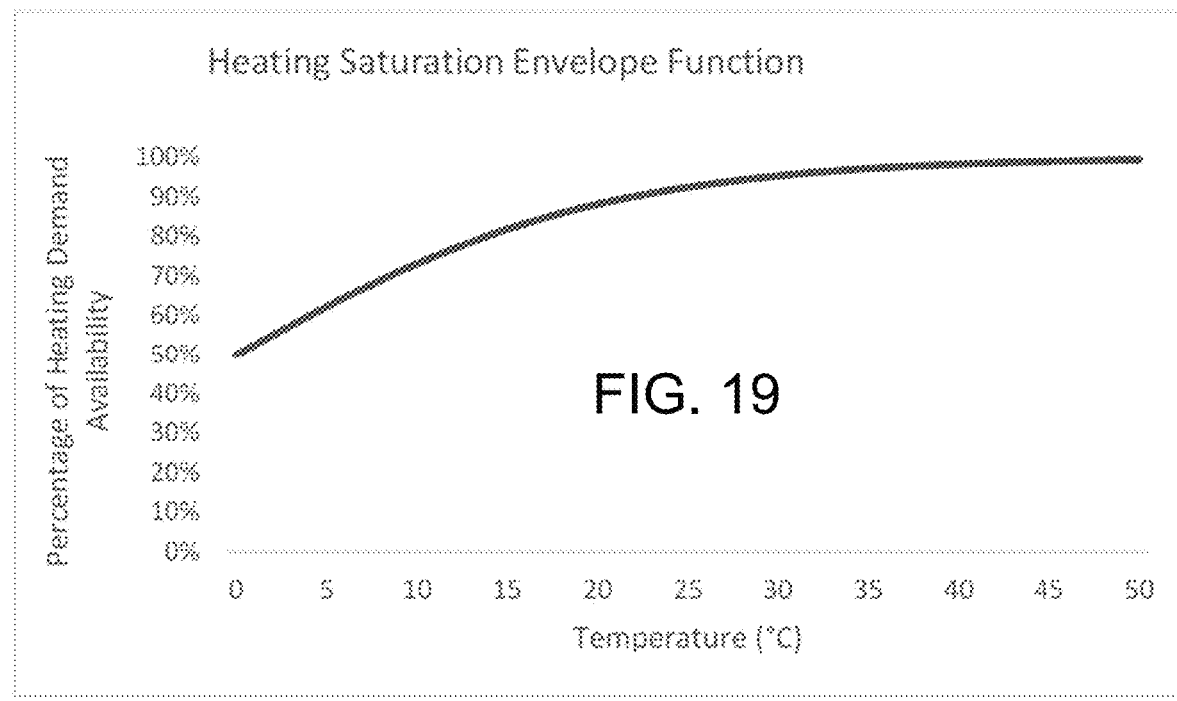
FIG. 19 shows an example of a heating saturation envelope function curve, according to the principles of the disclosure.

FIGS. 16 and 17 show examples of a cooling required envelope function $E_{cs}(T)$ curve and a heating required envelope function $E_{hs}(T)$ curve, respectively; and FIGS. 18 and 19 show examples of a cooling saturation envelope function $1-E_c(T_{avg})$ curve and a heating saturation envelope function $1-E_h(T_{avg})$ curve, respectively.

As seen in FIG. 16, a system's demand for cooling, as represented by the $E_{cs}(T)$ curve, can increase from a percentage of cooling demand saturation of about 0% at 0° C. to about 100% at about 30° C. In other words, as the ambient temperature increases from 0° C. to 50° C., a system's need for cooling also increases.

On the other hand, as seen in FIG. 17, a system's demand for heating, as represented by the $E_{hs}(T)$ curve, can decrease from a percentage of heating demand saturation of about 100% at 0° C. to about 0% at about 35° C. In other words, as the ambient temperature increases from 0° C. to 50° C., a system's need for heating decreases.

The cooling saturation envelope function $(1-E_c(T_{avg}))$ curve, which represents the system's capacity to cool, shows that equation (9.5) may only contribute significantly during hot days, as seen in FIG. 18. In the example depicted in FIG. 18, the largest demand changes occur within the range of about 20° to about 37° C.

Whereas, the heating saturation envelope function $(1-E_h(T_{avg}))$ curve, which represents the system's capacity to heat, shows that equation (9.7) may only contribute significantly during cold days (e.g., T<10° C.), as seen in FIG. 19. In the example depicted in FIG. 19, the temperature starts from 0° C. because, in this example, the geographic region is located in a hot climate. In this example, the largest demand changes occur within the range of about 0° to about 20° C. The two cooling functions $E_{cs}(T)$ and $(1-E_c(T_{avg}))$ can be combined together (e.g., separately for each season) to determine a combined cooling envelope function $E_{cs}(T)(1-E_c(T_{avg}))$, which can be determined as in equations (9.4) and (9.5).

Figure 20:
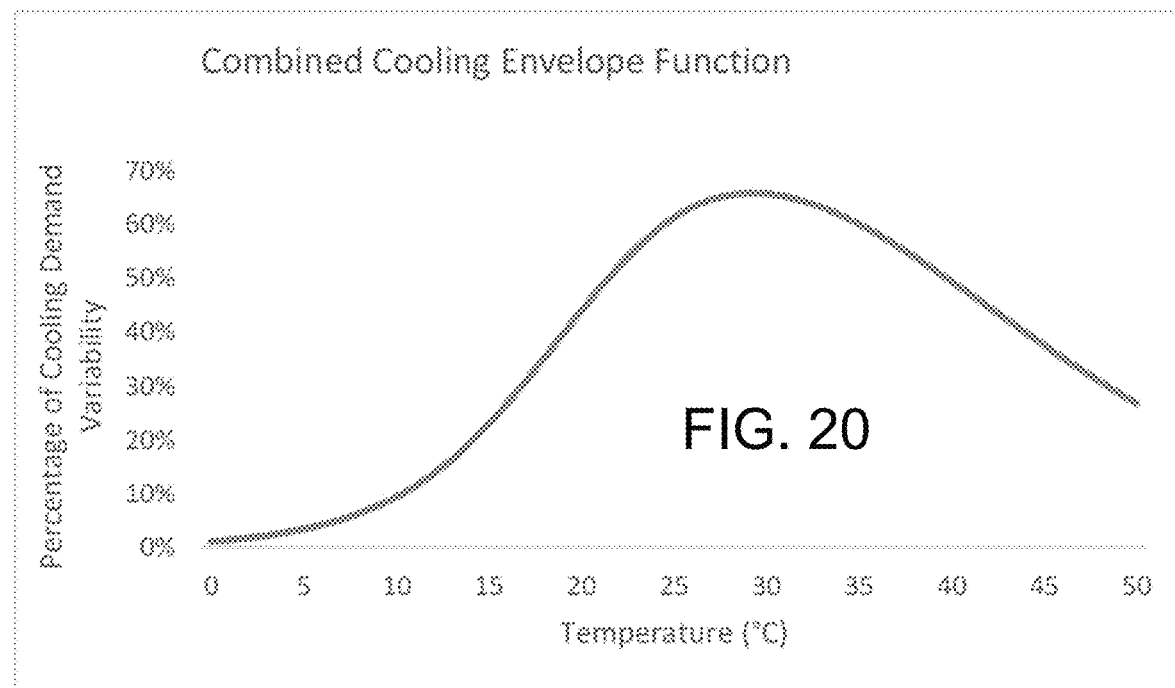
FIG. 20 shows an example of a combined cooling envelope function curve, according to the principles of the disclosure.
Figure 21:
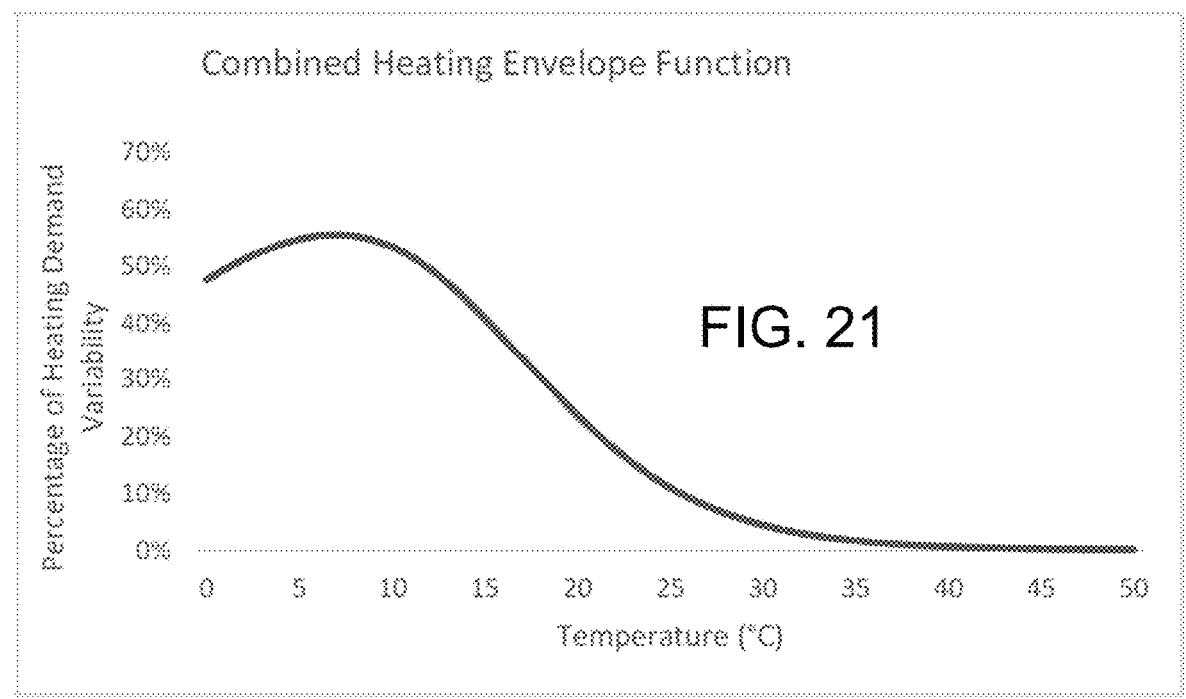
FIG. 21 shows an example of a combined heating envelope function curve, according to the principles of the disclosure.

FIG. 20 shows an example of a combined cooling envelope function $(E_{cs}(T)(1-E_c(T_{avg})))$ curve, showing the percentage of cooling demand variability as a function of temperature. As seen in this example, cooling demand variability can be large for temperatures in the band between about 15° C. and about 45° C. The two heating functions $E_{hs}(T)$ and $(1-E_h(T_{avg}))$ can be combined together (e.g., separately for each season) to determine a combined heating envelope function $E_{hs}(T)(1-E_h(T_{avg}))$, which can be determined as in equations (9.6) and (9.7).

Combining both the combined cooling envelope function $(E_{cs}(T)(1-E_c(T_{avg})))$ and combined heating envelope function $(E_{hs}(T)(1-E_h(T_{avg})))$, a combined intraday envelope function (e.g., equation (8)) can be determined, as in equations (9.4) to (9.7).

Figure 22:
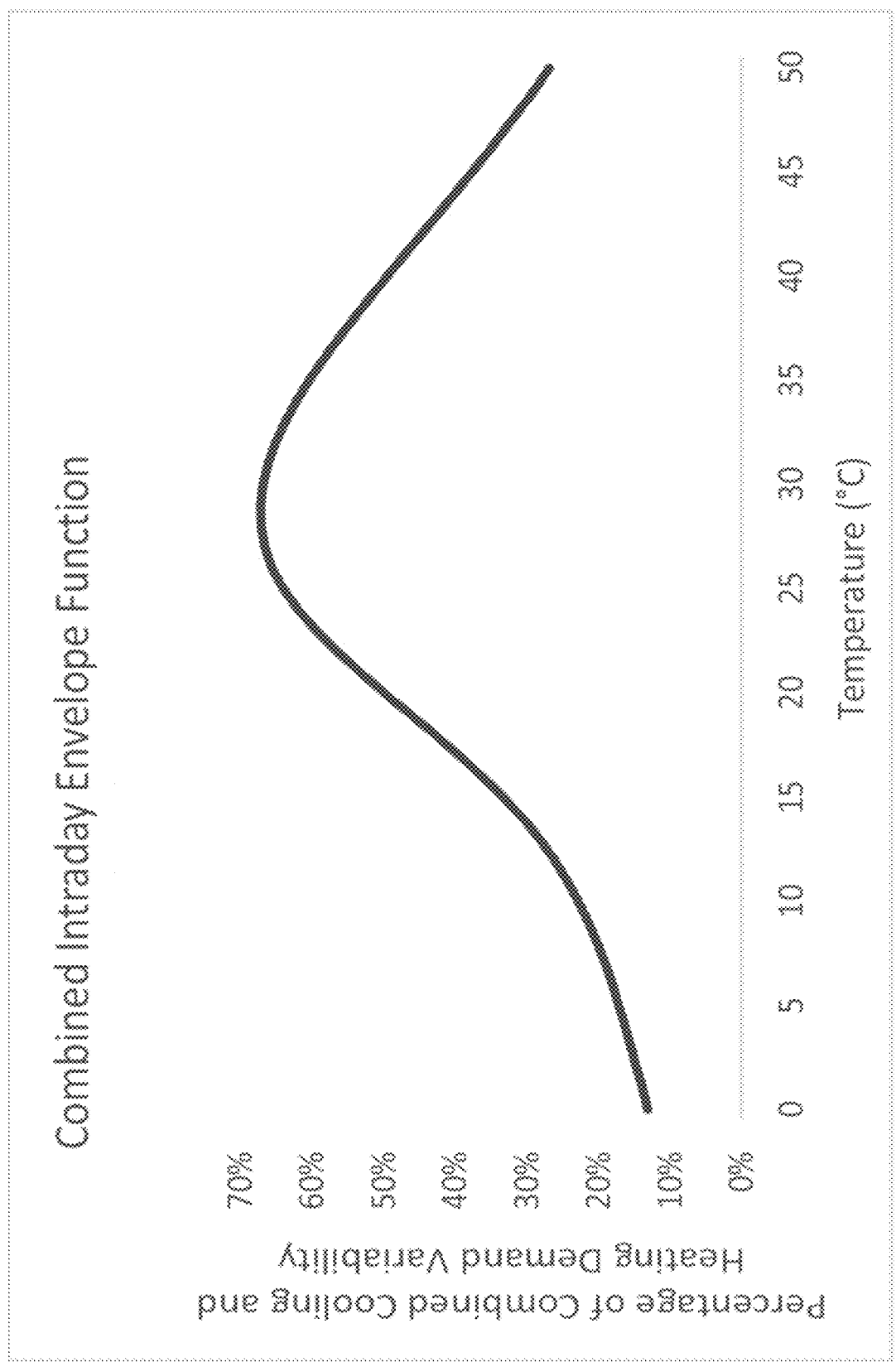
FIG. 22 shows an example of the combined intraday envelope function plot of percentage of combined cooling and heating demand variability with respect to temperature, according to the principles of the disclosure.

FIG. 22 shows an example of the combined intraday envelope function $(E_{cs}(T)(1-E_c(T_{avg}))+R_{ch}E_{hs}(T)(1-E_h(T_{avg})))$ plot of percentage of combined cooling and heating demand variability with respect to temperature. This example has a small heating to cooling ratio value $R_{ch}$ because the geographic region is located in a hot climate. As seen in the example depicted in FIG. 22, systems can have a higher capacity to react at mild temperatures because, for example, not all ACs are likely to be operated at full capacity. On the other hand, at extremely high temperatures, ACs are likely to be saturated because they are mostly set to high and cannot cool further. Similarly, for extremely cold temperatures, heaters are likely to be saturated because they are mostly set to high and cannot heat further.

Humidity can have a significant effect on electricity demand. The humidity effect can be factored into the electricity demand estimation. The humidity "feels-like" correction, $HUM(H,H_{avg},T_{avg})$ can be determined based on equation (10):

$$HUM(H, Havg, Tavg) = \frac{S_H}{(1+e^{-a_H(T_{avg}-T_H)})^{p_H}(1+e^{-b_H(H-H_{avg}-H_H)})^{q_H}} \quad (10)$$

where $S_H$ is a maximum humidity correction, $a_H$ is the temperature sensitivity of humidity correction, $T_H$ is the humidity correction triggering temperature, $p_H$ is the humidity correction temperature profile factor, $b_H$ is the humidity sensitivity of humidity correction, $H_H$ is the humidity correction triggering humidity, and $q_H$ is the humidity correction humidity profile factor.

Figure 23:
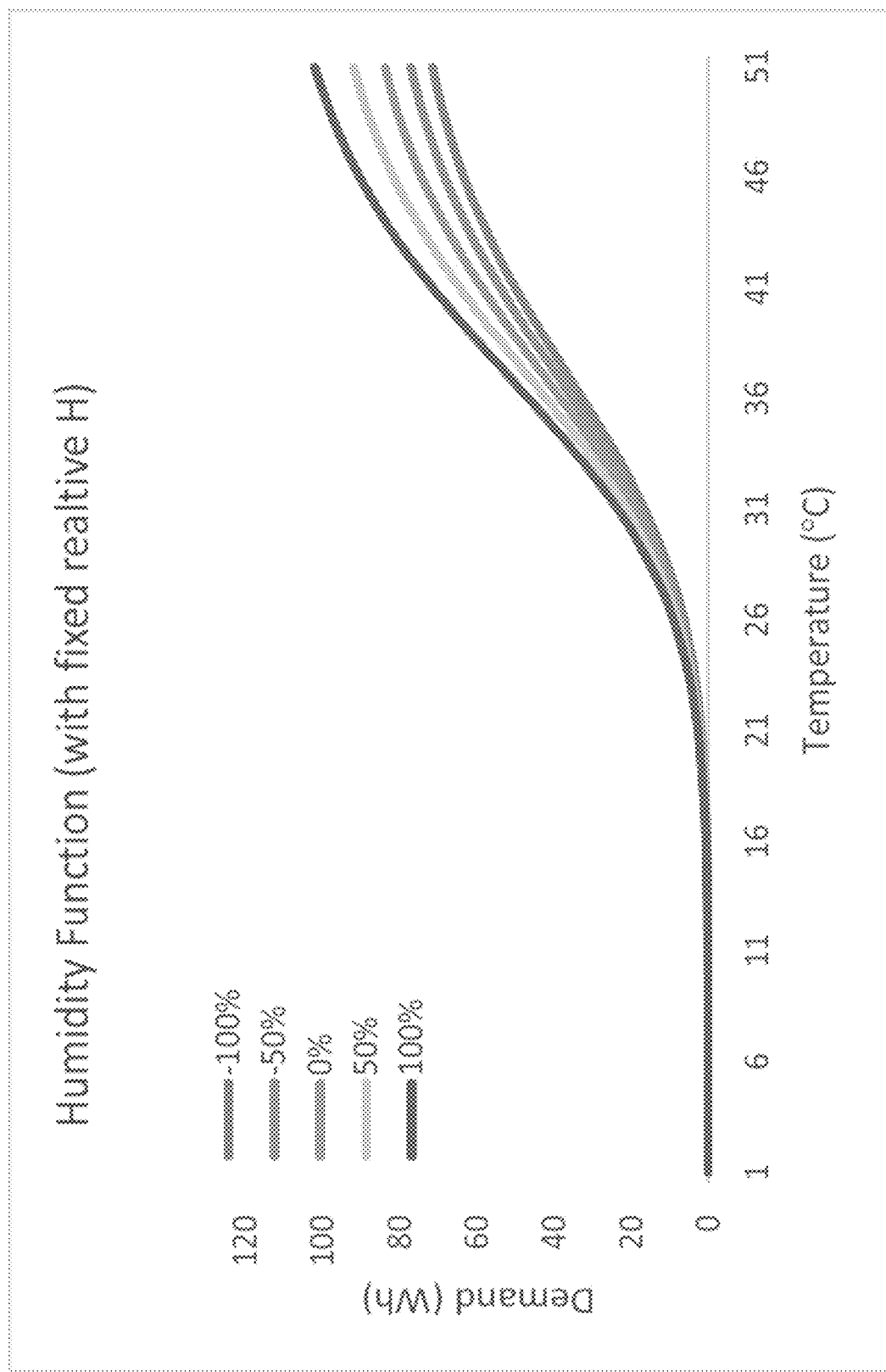
FIG. 23 shows an example of modeled humidity demand based on a humidity function, according to the principles of the disclosure.

FIG. 23 shows an example of modeled humidity demand based on the humidity function $HUM(H,H_{avg},T_{avg})$, showing demand (Wh) relative to temperature (° C.). In this example, the relative humidity H is fixed. In the example depicted in the diagram, the five distinct curves illustrate examples of variations in the humidity function with respect to relative humidity (e.g., 100%, 50%, 0%, −50%, −100%). Although the curves have similar shapes, the slopes of the curves decrease with decreasing relative humidity, with 100% relative humidity curve having the greatest slope and the −100% relative humidity curve having the lowest slope. As seen in the diagram, humidity impact is only significant at higher temperatures, such as, for example, above 26° C.

Vacation effect can have a significant effect on electricity demand. When a geographic region undergoes extremely high or extremely low temperatures, people tend to relocate temporarily to avoid the extreme temperatures. For example, people may relocate temporarily to a cooler region (e.g., cooler part of the country or world) to avoid extremely high temperatures or humidity levels. In the United States, for example, people tend to migrate during the winter from New York state to the much warmer climate of Florida state, and reverse migrate during the summer. The vacation effect can be factored into the electricity demand estimation by, for example, the electricity demand modeler 180 (shown in FIG. 2), by factoring in the vacation demand function $VAC(T,H,H_{avg})$, which can be determined based on equation (11):

where V is the vacation (extremely hot/cold weather) demand, $a_v$ is the temperature sensitivity of vacation correction, $TV_0$ is the vacation correction triggering temperature, $p_v$ is the vacation correction temperature profile factor, $b_v$ is the humidity sensitivity of vacation correction, $HV_0$ is the vacation correction triggering humidity, and $q_v$ is the vacation correction humidity profile factor.

Figure 24:
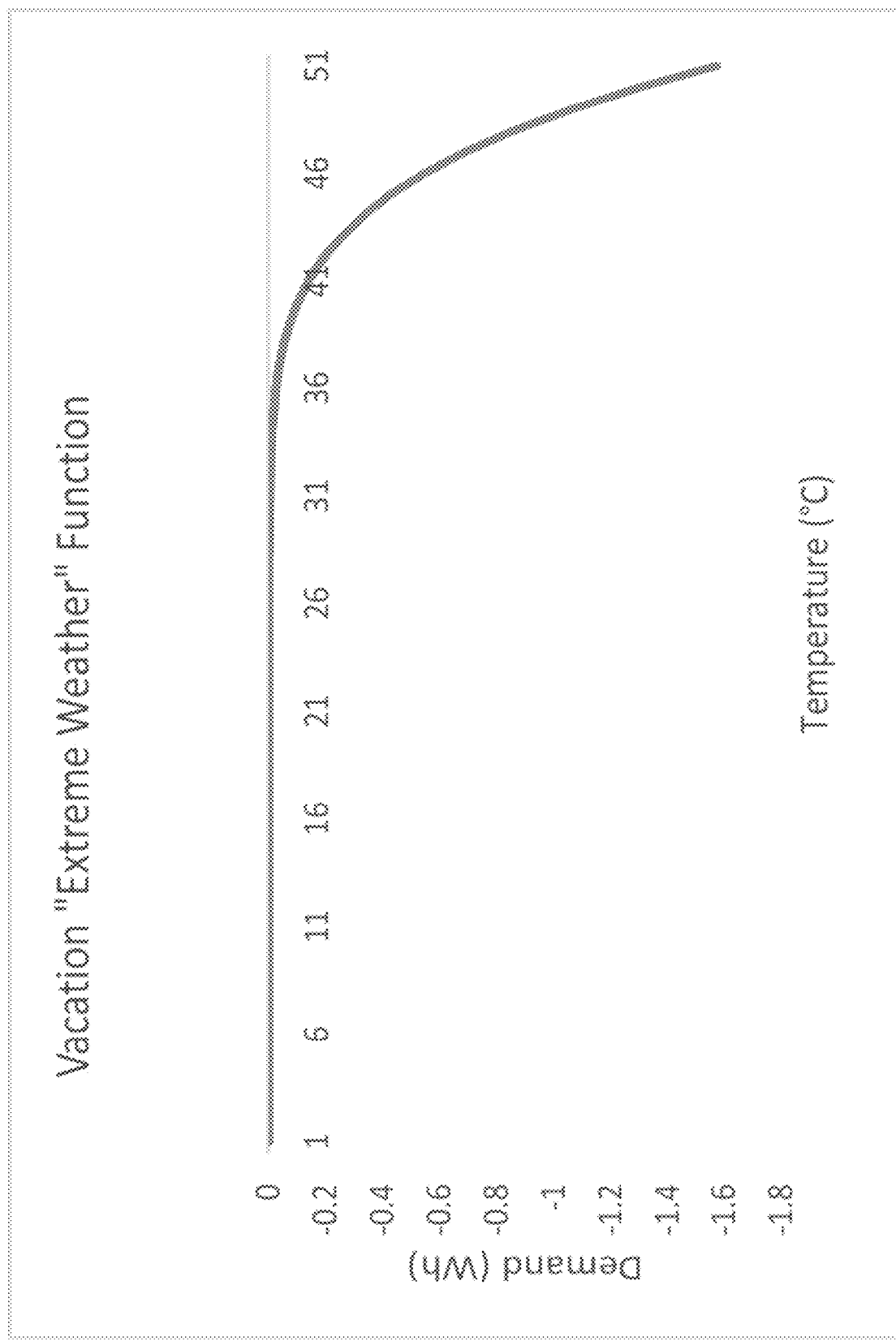
FIG. 24 shows an example of modeled vacation demand based on a vacation demand function, according to the principles of the disclosure.

FIG. 24 shows an example of modeled vacation demand based on the vacation demand function $VAC(T,H,H_{avg})$, showing demand (Wh) relative to temperature (° C.). In the example depicted in the diagram, the geographic region is located in hot climate. As seen in the diagram, the modeled vacation demand decreases during extreme weather such as high temperatures and high humidity.

Calendar effect can have a significant effect on electricity demand. For example, in certain geographic regions, the lunar calendar (e.g., Hijri or Islamic calendar) is used alongside the Gregorian calendar to date events in the regions (e.g., Ramadan, Hajj, Eid celebrations, and school holidays). Including a lunar calendar correction $CAL_l$ can factor in the impact of certain events such as Ramadan or the Hajj on demand in certain geographic regions.

Figure 25A:
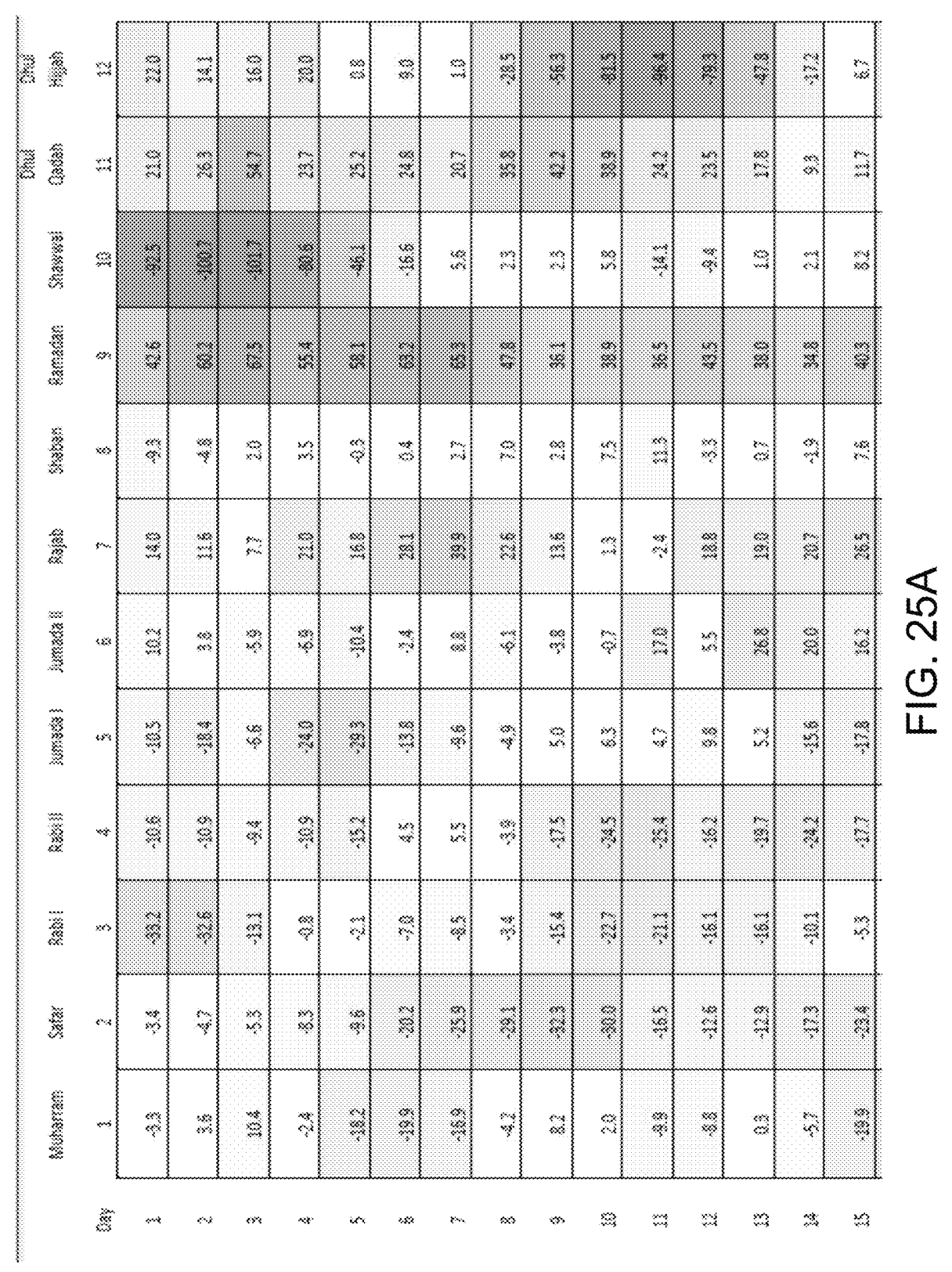
Figure 25B:
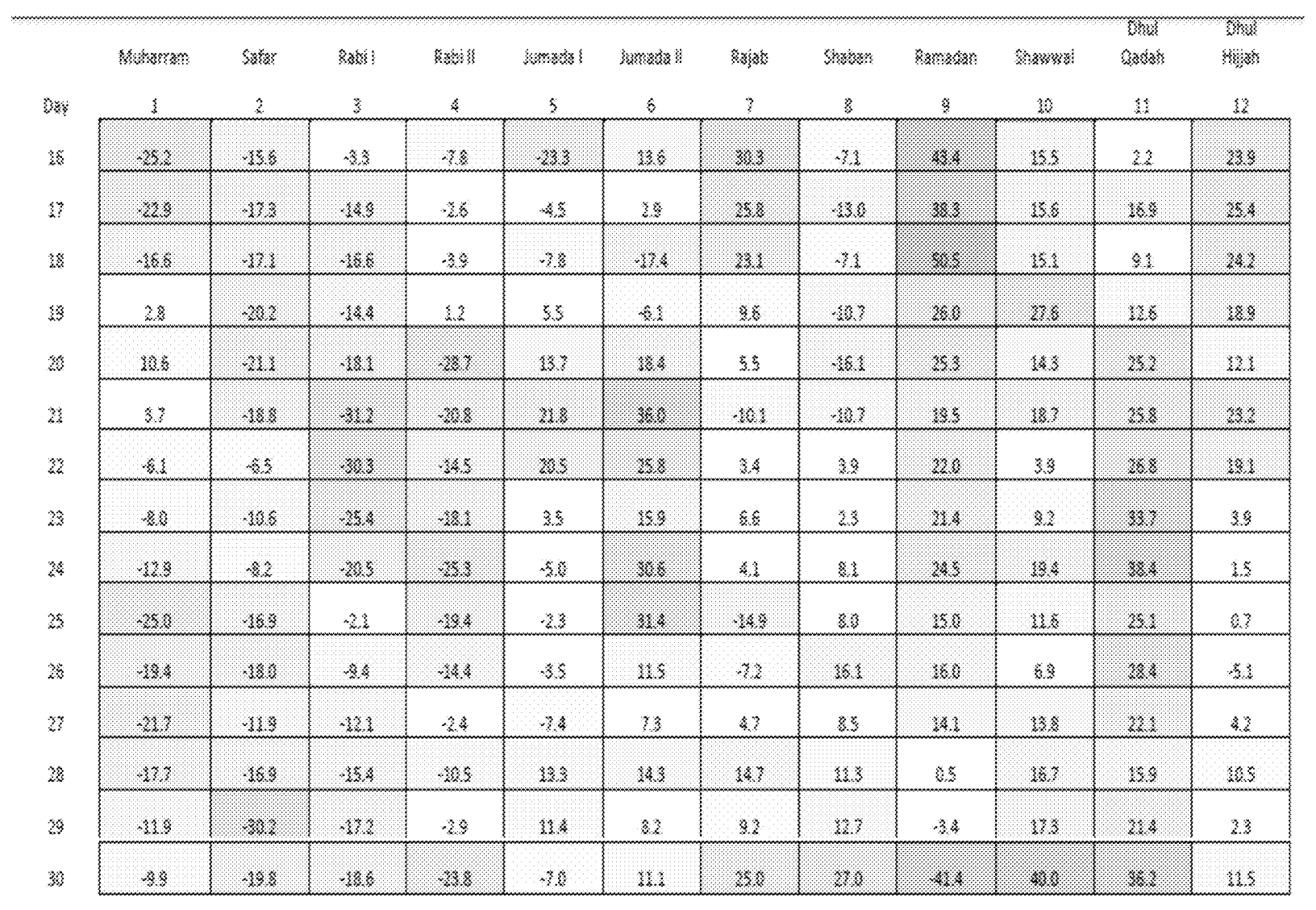

FIGS. 25A and 25B show an example of a table that can be determined, for example, by the electricity demand modeler 180 (shown in FIG. 2), based on a lunar calendar correction $CAL_l$, equation (5.2). The table shows major calendar events in columns and days in rows. Several observations can be made based on the table. For instance, there is a significant increase in electricity demand during Ramadan and the months building up to Hajj, and shortly after, as a result of a large population inflow into the region Also observable in the table is a significant drop in demand during the two Eids (Shawwal and Dhul Hijjah) as a portion of the local population leaves for vacation.

Solar calendar-related events can also have a significant impact on electricity demand. The solar calendar correction $CAL_S$ can be factored into the demand model to more accurate model demand in the geographic region. Solar calendar-related events like, for example, New Year, Easter, spring break, summer, thanksgiving, or Christmas) can have an impact on demand in certain geographic regions. Including a solar calendar correction $CAL_s$ can factor in the impact of such events on demand for the region.

FIGS. 26A and 26B show an example of a table that can be determined, for example, by the electricity demand modeler 180 (shown in FIG. 2), based on a solar calendar correction $CAL_s$, equation (5.3). The table shows months in columns and days in rows. In this particular example, the geographic region is less impacted by the solar calendar than the lunar calendar.

The following TABLE 1 is a list of values of constants that were included in the examples shown in FIGS. 4 to 26B.

TABLE 1

(VALUES OF CONSTANTS IN EXAMPLES)

| CONSTANT | VALUE | CONSTANT | VALUE |
|---|---|---|---|
| rw | 0.03 | rb | 0.04 |
| Dc | 1997.90 | Dh | 526.40 |
| Tc | 43.54 | Wmax | 20.36 |
| ac | 0.10 | Smin | 4.70 |
| mc | 0.02 | Wmin | 2.10 |
| qc | 0.01 | Smax | 7.02 |
| Troom | 22.0 | $a_0$ | 0.42 |
| $a_1$win | 0.29 | Tspring | 23.84 |
| $a_1$sum | 0.14 | SH | 0.14 |
| ahs | 0.11 | aH | 0.00 |

TABLE 1-continued (VALUES OF CONSTANTS IN EXAMPLES)

| CONSTANT | VALUE | CONSTANT | VALUE |
|---|---|---|---|
| $ah$ | 0.99 | $TH$ | −15.60 |
| $Ths$ | 49.24 | $pH$ | 2.72 |
| $Th$ | 50.00 | $bH$ | 1.00 |
| $Rch$ | 1.88 | $HH$ | −0.30 |
| $acs$ | 0.22 | $qH$ | 0.02 |
| $ac$ | 0.04 | $V$ | 0.01 |
| $Tcs$ | −94.19 | $av$ | 0.00 |
| $Tc$ | −16.07 | $TV_0$ | 60.00 |
| $Dh$ | 0.00 | $pv$ | 10.00 |
| $Th$ | −30.00 | $bv$ | 1.00 |
| $ah$ | 1.00 | $HV_0$ | 1.00 |
| $mh$ | 0.00 | $qv$ | 0.05 |

Referring to FIGS. 1 and 3A to 3C, a description is now provided regarding the non-limiting embodiment of the electricity demand and forecasting process 200. Initially, the process 200 can begin with the modeling and forecasting unit 30 receiving data from a data source 10 (Step 203). The received data can include weather data 10A, electricity demand data 10B, economic data 10C, end user data 10D, population data, calendar-specific data, and other relevant data. The data may need to be cleaned and pre-processed to correct outliers and fill any gaps, for example, by interpolating the input data (for example, weather, population and demand data) after it has been cleaned. If, as is often the case, weather and population data is available for subregions of the region of interested (for example, for states within a given country), these can be combined to produce population-weighted weather data for the entire region. Using population-weighted weather data can result in a more accurate model of electricity demand than using data from a single weather station or a simple regional average of weather data, as electricity consumption is typically concentrated at the population centers. The weather and population data can also be used to develop future weather and population forecasts (range of possible methodologies not specified here) that can be used as inputs for the future electricity demand forecasts. The process can initially start with weather as an initial driver and periodically (e.g., hourly) acquire temperature data, humidity data, and electricity usage data for the geographic region during each day. The population and population demographics for the region can also be acquired.

Based on the received data, the modeling and forecasting unit 30 can build a core per-capita parametric model for high-level features of a demand curve as a function of temperature and time (Step 206). The population for the region can be modeled or measured separately. Using the received data, the modeling forecasting unit 30 can generate an electricity demand model for the geographic region that can provide accurate forecasting of future electricity demand in the region, while providing visibility into each driver of the electricity demand model.

The core parametric model can include contributions from a base electricity load with a parametrized growth rate $D_b e^{rbt}$. The modeling and forecasting unit 30 can capture the base load demand BASE(t) (equation (2), i.e., BASE(t)=$D_b e^{rbt}$) for the geographic region, which can include the demand that is always present for the region, irrespective of changes in weather. This part of the model is weather independent.

The modelling and forecasting unit 30 can apply correction terms to S-curve(s) to account for efficiency of appliances (not shown) at nodes in the PGD network 40 at extreme temperatures (Step 209). The model can optimize heating and cooling demand (Step 212) by including contributions from the sum of independent heating and cooling terms, which can be modeled as S-curves with respect to decreasing and increasing temperature, respectively, with the respective magnitudes typically depending upon the regional climate and the penetration of heating or cooling appliances in the PGD network 40.

The electricity demand due to cooling appliances (e.g., air-conditioning (AC) units) can be determined based on the cooling demand function COOL(T,$T_{avg}$), which capture AC cooling demand and cooling efficiency degradation, as seen in equation (3). The electricity demand due to heating appliances (e.g., boilers, heat pumps, electric radiators, stoves) can be determined based on the heating demand function HEAT(T,$T_{avg}$), which capture heating demand and heating efficiency degradation, as seen in equation (4). FIG. 4 shows an example of cooling and heating demand s-curves.

Residual intraday variations in electricity demand, for example, with respect to intraday variations in temperature, can be modeled by the modeling and forecasting unit 30 from the daily mean (Step 215). This can be modeled initially as a parametrized function ITV(T,$T_{avg}$) of the relative temperature. Subsequently, the parameterized function ITV(T,$T_{avg}$) can be allowed to vary with temperature according to the season (Step 218) and an average residual electric demand with respect to temperature can be determined (Step 221), as in equations (6) and (9.1) to (9.7).

Intraday temperature and seasonal demand parameters can be iteratively optimized (Step 224). This step can be performed by repeating the processes in Steps 209 to 221 until the residual error approaches, for example, zero. A residual error threshold value can be predetermined and used as a reference value. The residual error threshold can be set to a value that is near zero, such as, for example, 0.01, 0.001, 0.0001, or less. After each optimization iteration (Step 224), a determination can be made whether the change in residual error is less than the predetermined threshold (Step 227). If the change in residual error is not less than the threshold (NO at Step 227), then another optimization iteration is carried out (Step 224), otherwise all parameters are optimized (YES at Step 227, then Step 230).

After all parameters have been optimized (Step 230), a determination can be made whether a change in residual error is less than the predetermined threshold (Step 233). If it is determined that the change in residual error is not less than the threshold (NO at Step 233), then the process may return to Step 212 and repeat Steps 212 to 233. If it is determined that the change in residual error is less than the threshold (YES at Step 233), then the modeling and forecasting unit 30 may proceed to model effects of humidity on electric demand as a function of temperature and intraday variations in humidity (Step 236). The humidity effect on electrical demand for the geographic region can be captured based on the humidity function HUM(H, $H_{avg}$,$T_{avg}$), as in equation (10). As discussed above, FIG. 23 shows an example of modeled humidity demand based on the humidity function HUM(H,$H_{avg}$,$T_{avg}$), showing demand (Wh) relative to temperature (° C.). As seen in equation (10), the effects on electrical demand can be modeled, including taking into account any variations in intraday humidity.

The modeling and forecasting unit 30 can update the parametric model and/or build a new per-capita parametric model for high-level features of the demand curve as a function of temperature and time (Step 239). The updated and/or new parametric model can include contributions from the base electricity load demand BASE(t) (equation (2), i.e., BASE(t)=$D_b e^{rbt}$) for the geographic region.

The model can be updated with any corrections due to extremes of temperature or humidity that can lead to a tendency of humans to physically relocate elsewhere temporarily (Step 242). In this regard, the vacation demand function VAC(T,H,$H_{avg}$) can capture such corrections, as in equation (11). After modeling correction to demand due to temperature or humidity extremes, for example, based on the vacation demand function VAC(T,H,$H_{avg}$) (Step 242), the temperature and humidity extreme parameters can be optimized (Step 245). The vacation demand function VAC(T,H,$H_{avg}$) can capture vacation effect that can be observed during very high or very low temperature or humidity seasons, due to people relocating temporarily to more favorable (cooler or warmer) regions to avoid the extreme temperature/humidity conditions. As discussed above, FIG. 24 shows an example of a vacation demand function VAC(T,H,$H_{avg}$) as temperature varies from 0° C. to 51° C. for a warm climate region.

In order to take into account calendar effects, the modeling and forecasting unit 30 can correlate the determined values with known calendar events to determine parametric values for each event (Step 248) and determine average residual variations in demand throughout the lunar and solar year (Step 251), taking into consideration known calendar events, such as, for example, holiday periods (e.g., spring break, summer holidays, Christmas holidays, the two Eids, etc.), religious events (e.g., Hajj, Ramadan, Easter) and special events (e.g., national days, soccer world cup finals, Miss World beauty contest, etc.). To address potential overestimates in, for example, behavior-dependent residual variations, the calendar effect function $CAL_t$ can be iteratively applied to optimize calendar effect and take into consideration a human behavior correction, as in equations (5) and (5.1) to (5.3) (Step 252). After each iteration (Step 252), a determination can be made whether a change in a residual error is less than the predetermined threshold (Step 254) and the iterative optimization repeated (NO at Step 254, then Step 252) until the change in residual error is determined to be less than the predetermined threshold (YES at Step 254).

If the change in residual error is determined to be less than the threshold (YES at Step 254), then all parameters may be optimized (Step 257). After all parameters have been optimized (Step 257), a determination can be made whether a change in residual error is less than the predetermined threshold (Step 260). If it is determined that the change in residual error is not less than the threshold (NO at Step 260), then the process may return to Step 212 and repeat Steps 212 to 260. If it is determined that the change in residual error is less than the threshold (YES at Step 260), then the modeling and forecasting unit 30 may proceed to determine whether additional distinguishable effects exist in the residual demand (Step 263).

If it is determined that additional distinguishable effects exist in the residual demand (YES at Step 263), then such distinguishable effects can be parametrically modeled in the residual demand and the models prioritized according to the magnitude of the contribution to residual demand (Step 266). However, if it is determined that no additional distinguishable effects exist in the residual demand (NO at Step 263), then the process may return to the beginning and repeat Steps 203 to 266.

After the additional distinguishable effects are parametrically modeled and prioritized (Step 266), the parameters can be optimized for residual demand (Step 269) and, then, all parameters may be optimized (Step 272). After optimizing all parameters (Step 272), a determination can be made whether a change in residual error is less than the threshold (Step 275). If it is determined that the change in residual error is less than the threshold (YES at Step 275), then the process may return to beginning and repeat Steps 203 to 270, otherwise the process returns to Step 212 and repeats Steps 212 to 270 (NO at Step 275). Throughout the process 200, parameters can be optimized in a recursive fashion by repeating applicable Steps in the process, as will be understood by those skilled in the art.

Having established an optimal set of parameters over a given calibration period (for example, six years from 2010-2016), the same method can be used to estimate the evolution of one or more parameters of the model over time, by applying the method to a sliding window of a fixed period length (for example, two years) to optimize the values of the parameters of interest which are allowed to vary while keeping the remaining parameters fixed. By sliding this (for example, two-year) window (for example, month-by-month) over a range of dates (for example, from 2005 to 2019), the evolution can be inferred over time (for example, monthly) of the specific parameters of interest which have been allowed to vary. For example, if the parameter rb is allowed to vary in this way, the time-evolution of its value can provide an excellent proxy for the economic growth of the region over time. The time-evolution of the optimal values of other parameters can be similarly informative.

The electricity demand model generated by the process 200 can be used to forecast future electricity demand in the PGD network 40 (shown in FIG. 1). The generated demand model can be accessed by, for example, the electricity demand forecaster 190 (shown in FIG. 2) and transmitted to the communicating device 45 in the PGD network 40 or accessed by the communicating device 45 through communication with the electricity demand forecaster 190, so as to take remedial actions to address forecasted demands. A remedial action can include, for example, adjusting one or more parameters or components in the PDG network 40, such as, for example, at a power plant (not shown), a substation, a power grid, or smart meters at end user nodes. For instance, one or more electrical generators can be added or put online to accommodate a forecasted increase in demand or powered down or taken offline where a decrease in demand is forecasted.

The model has two unique properties in that (i) it generates remarkably accurate forecasts of electricity demand, and (ii) the parameters of the model are meaningful and their evolution can also be quite important in a business context. The accuracy of the model makes it possible to estimate with some accuracy, the time evolution of such parameters.

This can be done for example by starting with a reliable initial set of model parameters which have been optimized over a relatively long time period (e.g. over the six years from 2010-2016), and then re-optimizing the parameter(s) of interest over a shorter period, e.g. over a time-window of just one or two years, and sliding that window, say, month-by-month over the period of interest (e.g. month-by-month from 2005 to 2019), while keeping the other parameters fixed. The optimized value of a parameter over the January 2005-to-January 2007 time period would, for example, provide a good estimate of that parameter for January 2006, and so on month-by-month all the way to January 2017-to-January 2019, say, for the value of that parameter in January 2018. The instant disclosure can be used to, for example, estimate growth in the economy over time—which can be difficult to measure reliably using other data. g this as an additional claim in the patent.

The terms "a," "an," and "the," as used in this disclosure, means "one or more," unless expressly specified otherwise.

The term "backbone," as used in this disclosure, means a transmission medium that interconnects one or more computing resources to provide a path that conveys data signals and instruction signals between the one or more computing resources. The backbone can include a bus or a network. The backbone can include an ethernet TCP/IP. The backbone can include a distributed backbone, a collapsed backbone, a parallel backbone or a serial backbone. The backbone can include any of several types of bus structures that can further interconnect to a memory bus (with or without a memory controller), a peripheral bus, and a local bus using any of a variety of commercially available bus architectures.

The term "communicating device," as used in this disclosure, means any hardware, firmware, or software that can transmit or receive data packets, instruction signals, data signals or radio frequency signals over a communication link. The communicating device can include a computer or a server. The communicating device can be portable or stationary.

The term "communication link," as used in this disclosure, means a wired or wireless medium that conveys data or information between at least two points. The wired or wireless medium can include, for example, a metallic conductor link, a radio frequency (RF) communication link, an Infrared (IR) communication link, or an optical communication link. The RF communication link can include, for example, WiFi, WiMAX, IEEE 802.11, DECT, 0G, 1G, 2G, 3G, 4G, or 5G cellular standards, or Bluetooth. A communication link can include, for example, an RS-232, RS-422, RS-485, or any other suitable serial interface.

The terms "computer" or "computing device," as used in this disclosure, means any machine, device, circuit, component, or module, or any system of machines, devices, circuits, components, or modules which are capable of manipulating data according to one or more instructions, such as, for example, without limitation, a processor, a microprocessor, a graphics processing unit, a central processing unit, a general purpose computer, a super computer, a personal computer, a laptop computer, a palmtop computer, a notebook computer, a desktop computer, a workstation computer, a server, a server farm, a computer cloud, or an array of processors, microprocessors, central processing units, general purpose computers, super computers, personal computers, laptop computers, palmtop computers, notebook computers, desktop computers, workstation computers, or servers. A computing device can include an application specific integrated circuit (ASIC) or a field-programmable gate array (FPGA).

A "computing resource," as used in this disclosure, means any computing device, communicating device, computer program, computer application, application program interface, or any other software, firmware, or hardware that can receive, transmit or process an instruction or command or data.

The term "computer-readable medium," as used in this disclosure, means any storage medium that participates in providing data (for example, instructions) that can be read by a computer. Such a medium can take many forms, including non-volatile media and volatile media. Non-volatile media can include, for example, optical or magnetic disks and other persistent memory. Volatile media can include dynamic random access memory (DRAM). Common forms of computer-readable media include, for example, a floppy disk, a flexible disk, hard disk, magnetic tape, any other magnetic medium, a CD-ROM, DVD, any other optical medium, punch cards, paper tape, any other physical medium with patterns of holes, a RAM, a PROM, an EPROM, a FLASH-EEPROM, any other memory chip or cartridge, a carrier wave, or any other medium from which a computer can read. The computer-readable medium can include a "Cloud," which includes a distribution of files across multiple (for example, thousands of) memory caches on multiple (for example, thousands of) computers.

Various forms of computer readable media can be involved in carrying sequences of instructions to a computer. For example, sequences of instruction (i) can be delivered from a RAM to a processor, (ii) can be carried over a wireless transmission medium, or (iii) can be formatted according to numerous formats, standards or protocols, including, for example, WiFi, WiMAX, IEEE 802.11, DECT, 0G, 1G, 2G, 3G, 4G, or 5G cellular standards, or Bluetooth.

The term "database," as used in this disclosure, means any combination of software or hardware, including at least one application or at least one computer. The database can include a structured collection of records or data organized according to a database model, such as, for example, but not limited to at least one of a relational model, a hierarchical model, or a network model. The database can include a database management system application (DBMS) as is known in the art. The at least one application may include, but is not limited to, for example, an application program that can accept connections to service requests from clients by sending back responses to the clients. The database can be configured to run the at least one application, often under heavy workloads, unattended, for extended periods of time with minimal human direction.

The terms "including," "comprising" and their variations, as used in this disclosure, mean "including, but not limited to," unless expressly specified otherwise.

The term "node," as used in this disclosure, means a physical or virtual location in a geographic region that can receive electricity or electrical power.

The term "server," as used in this disclosure, means any combination of software or hardware, including at least one application or at least one computer to perform services for connected clients as part of a client-server architecture, server-server architecture or client-client architecture. A server can include a mainframe or a server cloud or server farm. The at least one server application can include, but is not limited to, for example, an application program that can accept connections to service requests from clients by sending back responses to the clients. The server can be configured to run the at least one application, often under heavy workloads, unattended, for extended periods of time with minimal human direction. The server can include a plurality of computers configured, with the at least one application being divided among the computers depending upon the workload. For example, under light loading, the at least one application can run on a single computer. However, under heavy loading, multiple computers can be required to run the at least one application. The server, or any if its computers, can also be used as a workstation.

Devices that are in communication with each other need not be in continuous communication with each other unless expressly specified otherwise. In addition, devices that are in communication with each other may communicate directly or indirectly through one or more intermediaries.

Although process steps, method steps, or algorithms may be described in a sequential or a parallel order, such processes, methods and algorithms may be configured to work in alternate orders. In other words, any sequence or order of steps that may be described in a sequential order does not necessarily indicate a requirement that the steps be performed in that order; some steps may be performed simultaneously. Similarly, if a sequence or order of steps is described in a parallel (or simultaneous) order, such steps can be performed in a sequential order. The steps of the processes, methods or algorithms described in this specification may be performed in any order practical. In certain non-limiting embodiments, one or more process steps, method steps, or algorithms can be omitted or skipped.

When a single device or article is described, it will be readily apparent that more than one device or article may be used in place of a single device or article. Similarly, where more than one device or article is described, it will be readily apparent that a single device or article may be used in place of the more than one device or article. The functionality or the features of a device may be alternatively embodied by one or more other devices which are not explicitly described as having such functionality or features.

While the disclosure has been described in terms of exemplary embodiments, those skilled in the art will recognize that the disclosure can be practiced with modifications in the spirit and scope of the appended claims. These examples are merely illustrative and are not meant to be an exhaustive list of all possible designs, embodiments, applications, or modifications of the disclosure.

What is claimed is:

1. A method for modeling and forecasting electricity demand in a power generation and distribution network which includes a plurality of nodes each having cooling appliances, heating appliances, or both cooling and heating appliances, the method comprising:
    building, using intraday temperature and electricity demand data, a per-capita parametric model of high-level features of an electric demand curve as a function of temperature and time for a geographic region in the power generation and distribution network, the electric demand curve comprising the high-level features and residual features, the high-level features comprising underlying base load and heating or cooling requirements;
    modeling, using a residual parametric model of the residual features of the electric demand curve, residual intraday variations in electric demand with respect to intraday variations in temperature from a daily temperature mean;
    determining, using the intraday electricity demand data and modeled high-level features of the electric demand curve, average residual variations in electric demand with respect to intraday time periods;
    iteratively optimizing, by an electricity demand modeling device, a residual error between the modeled residual intraday variations in electric demand and the determined average residual variations in electric demand by updating parameters in the residual parametric model until the residual error is below a predetermined threshold;
    repeating, by the electricity demand modeling device using an optimization method, the building, modeling, determining, and iteratively optimizing in a recursive fashion to optimize parameters of the per-capita and residual parametric models;
    determining, using the optimized parametric models, electricity demand per-capita for the geographic region; and
    applying the determined electricity demand per-capita for the geographic region to modify one or more electricity transmission parameters in a power generation station in order to adjust electric power distributed in the power generation and distribution network.

2. The method in claim 1, further comprising determining the residual error based on at least one of:
    a cooling demand function $COOL(T,T_{avg})$;
    a heating demand function $HEAT(T,T_{avg})$;
    an intraday temperature variation function $ITV(T,T_{avg})$;
    a humidity function $HUM(H,H_{avg},T_{avg})$;
    a vacation demand function $VAC(T,H,H_{avg})$; and
    a calendar effect function $CAL_t$,
    where T is population-weighted temperature, $T_{avg}$ is daily average temperature, H is population-weighted humidity, and $H_{avg}$ is daily average humidity.

3. The method in claim 1, further comprising modeling effects of humidity on the electric demand curve.

4. The method in claim 1, further comprising modeling effects of temperature on the electric demand curve.

5. The method in claim 1, further comprising:
    determining the average residual variations in electric demand throughout a lunar calendar year or solar calendar year.

6. The method in claim 1, further comprising:
    determining a distinguishable effect in the residual intraday variations in electric demand;
    generating a plurality of demand models; and
    prioritizing the plurality of demand models based on a magnitude of contribution to residual demand.

7. The method in claim 6, wherein generating the plurality of demand models comprises parametrically modelling the distinguishable effect in the residual intraday variations in electric demand to build at least one of the plurality of demand models.

8. The method in claim 1, further comprising:
    applying a seasonal variation function to the residual intraday variations in electric demand.

9. The method in claim 1, further comprising:
    transmitting the electricity demand per-capita for the geographic region to a communicating device.

10. The method in claim 1, further comprising:
    estimating an evolution of one or more parameters in the per-capita and residual parametric models over time.

11. The method in claim 10, wherein the estimating the evolution of one or more parameters in the per-capita and residual parametric models comprises sliding a window of a fixed period length to optimize a value of a parameter of interest while keeping remaining parameters fixed.

12. The method in claim 1, further comprising:
    supplying the adjusted electric power to a node in the geographic region.

13. A system for modeling and forecasting electricity demand in a power generation and distribution network that includes a plurality of nodes having cooling appliances or heating appliances, the system comprising:
    one or more computing devices, comprising:
        an electricity demand modeling device configured to build, using intraday temperature and electricity demand data, a per-capita parametric model of high-level features of an electric demand curve as a function of temperature and time for a geographic region in the power generation and distribution network, the electric demand curve comprising the high-level features and residual features, the high-level features comprising underlying base load and heating or cooling requirements;

model, using a residual parametric model of the residual features of the electric demand curve, residual intraday variations in electric demand with respect to intraday variations in temperature from a daily temperature mean;

determine, using the intraday electricity demand data and modeled high-level features of the electric demand curve, average residual variations in electric demand with respect to intraday time periods;

iteratively optimize a residual error between the modeled residual intraday variations in electric demand and the determined average residual variations in electric demand by updating parameters in the residual parametric model until the residual error is below a predetermined threshold; and repeat, using an optimization method, the building, modeling, determining, and iteratively optimizing in a recursive fashion to optimize parameters of the per-capita and residual parametric models; and an electricity demand forecasting device that determines, using the optimized parametric models, electricity demand per-capita for the geographic region and transmits the determined electricity demand per-capita model for the geographic region to a communicating device in the power generation and distribution network, wherein the communicating device is configured to apply the transmitted electricity demand per-capita for the geographic region in order to modify one or more electricity transmission parameters in a power generation station and to adjust electric power distributed in the power generation and distribution network.

14. The system in claim 13, wherein the electricity demand modeler modeling device is further configured to determine the residual error based on at least one of:
a cooling demand function COOL(T,$T_{avg}$);
a heating demand function HEAT(T,$T_{avg}$);
an intraday temperature variation function ITV(T,$T_{avg}$);
a humidity function HUM(H,$H_{avg}$,$T_{avg}$);
a vacation demand function VAC(T,H,$H_{avg}$); and
a calendar effect function $CAL_p$,
where T is population-weighted temperature, $T_{avg}$ is daily average temperature, H is population-weighted humidity, and $H_{avg}$ is daily average humidity.

15. The system in claim 13, wherein the electricity demand modeling device is further configured to model effects of humidity on the electric demand curve.

16. The system in claim 13, wherein the electricity demand modeling device is further configured to model effects of temperature on the electric demand curve.

17. The system in claim 13, wherein the electricity demand modeling device is further configured to determine the average residual variations in electric demand throughout a lunar calendar year or solar calendar year.

18. The system in claim 13, wherein the electricity demand modeler modeling device is further configured to:
determine a distinguishable effect in the residual intraday variations in electric demand;
generate a plurality of demand models; and
prioritize the plurality of demand models based on a magnitude of contribution to residual demand.

19. The system in claim 18, wherein the electricity demand modeling device is further configured to generate the plurality of demand models by parametrically modelling the distinguishable effect in the residual intraday variations in electric demand to build at least one of the plurality of demand models.

20. The system in claim 13, wherein the electricity demand modeling device is further configured to apply a seasonal variation function to the residual intraday variations in electric demand.

21. A non-transitory computer readable storage medium storing electricity demand modeling and forecasting instructions for causing per-capita electricity demand for a geographic region in a power generation and distribution network that includes a plurality of nodes having cooling appliances or heating appliances to be modeled and forecasted, the program instructions comprising the steps of:
building, using intraday temperature and electricity demand data, a per-capita parametric model of high-level features of an electric demand curve as a function of temperature and time for a geographic region in the power generation and distribution network, the electric demand curve comprising the high-level features and residual features, the high-level features comprising underlying base load and heating or cooling requirements;

modeling, using a residual parametric model of the residual features of the electric demand curve, residual intraday variations in electric demand with respect to intraday variations in temperature from a daily temperature mean;

determining, using the intraday electricity demand data and modeled high-level features of the electric demand curve, average residual variations in electric demand with respect to intraday time periods;

iteratively optimizing a residual error between the modeled residual intraday variations in electric demand and the determined average residual variations in electric demand by updating parameters in the residual parametric model until the residual error is below a predetermined threshold;

repeating, using an optimization method, the building, modeling, determining, and iteratively optimizing in a recursive fashion to optimize parameters of the per-capita and residual parametric models;

determining, using the optimized parametric models, electricity demand per-capita for the geographic region; and applying the determined electricity demand per-capita for the geographic region to modify one or more electricity transmission parameters in a power generation station in order to adjust electric power distributed in the power generation and distribution network.

22. The non-transitory computer readable storage medium in claim 21, the program instructions comprising the further step of determining the residual error based on at least one of:
a cooling demand function COOL(T,$T_{avg}$);
a heating demand function HEAT(T,$T_{avg}$);
an intraday temperature variation function ITV(T,$T_{avg}$);
a humidity function HUM(H,$H_{avg}$,$T_{avg}$);
a vacation demand function VAC(T,H,$H_{avg}$); and
a calendar effect function $CAL_p$,
where T is population-weighted temperature, $T_{avg}$ is daily average temperature, H is population-weighted humidity, and $H_{avg}$ is daily average humidity.

23. The non-transitory computer readable storage medium in claim 21, the program instructions comprising the further step of:

modeling effects of temperature or humidity on the electric demand curve.

24. The non-transitory computer readable storage medium in claim 21, the program instructions comprising the further step of:
supplying the adjusted electric power to a node in the geographic region.

* * * * *